United States Patent
LaCrosse et al.

(10) Patent No.: US 10,773,179 B2
(45) Date of Patent: Sep. 15, 2020

(54) METHOD OF AND SYSTEM FOR FACILITATING STRUCTURED BLOCK PLAY

(71) Applicants: Jim LaCrosse, Indianapolis, IN (US); John Baker, Indianapolis, IN (US)

(72) Inventors: Jim LaCrosse, Indianapolis, IN (US); John Baker, Indianapolis, IN (US)

(73) Assignee: Blocks Rock LLC, Indianapolis, IN (US)

(*) Notice: Subject to any disclaimer, the term of this patent is extended or adjusted under 35 U.S.C. 154(b) by 381 days.

(21) Appl. No.: 15/260,016

(22) Filed: Sep. 8, 2016

(65) Prior Publication Data
US 2018/0065058 A1 Mar. 8, 2018

(51) Int. Cl.
| | |
|---|---|
| *A63H 33/04* | (2006.01) |
| *G06F 3/16* | (2006.01) |
| *G06F 3/0481* | (2013.01) |
| *G09B 5/10* | (2006.01) |
| *G09B 5/12* | (2006.01) |
| *A63F 9/24* | (2006.01) |
| *G06T 19/20* | (2011.01) |

(Continued)

(52) U.S. Cl.
CPC ............ *A63H 33/042* (2013.01); *A63F 9/24* (2013.01); *A63F 13/25* (2014.09); *A63F 13/80* (2014.09); *A63F 13/92* (2014.09); *A63H 33/046* (2013.01); *G06F 3/04815* (2013.01); *G06F 3/16* (2013.01); *G06T 13/20* (2013.01); *G06T 19/20* (2013.01); *G09B 5/10* (2013.01); *G09B 5/125* (2013.01); *G09B 19/00* (2013.01); *A63F 2009/2457* (2013.01); *G06T 2200/24* (2013.01); *G06T 2219/016* (2013.01); *G06T 2219/024* (2013.01); *G06T 2219/2008* (2013.01); *G06T 2219/2016* (2013.01)

(58) Field of Classification Search
CPC ..... A63H 33/042; A63H 33/046; A63F 13/25; A63F 13/80; A63F 13/92
USPC ......................................... 463/211
See application file for complete search history.

(56) References Cited

U.S. PATENT DOCUMENTS

| | | | | |
|---|---|---|---|---|
| 2,147,237 A | * | 2/1939 | Bluthardt | A63H 33/04 446/85 |
| 4,522,404 A | * | 6/1985 | Di Gregorio | A63H 33/04 273/157 R |

(Continued)

FOREIGN PATENT DOCUMENTS

WO   WO 2005/124696 A1   12/2005

OTHER PUBLICATIONS https://www.youtube.com/watch?v=87hKzrjRWww, Hands-On with the Osmo game system for the iPad, 3:15 minutes, Published Oct. 1, 2014 (Year: 2014).*

(Continued)

*Primary Examiner* — Omkar A Deodhar
*Assistant Examiner* — Shauna-Kay Hall
(74) *Attorney, Agent, or Firm* — Bose McKinney & Evans LLP

(57) ABSTRACT

A system and a method for facilitating structured block play that includes a set of images providing a spatial representation of a predefined 3-D arrangement of blocks for analysis by a user, a set of blocks configured to be positioned by the user into a replication of the predefined 3-D arrangement, and an indicator for signaling the user's completion of the replication.

44 Claims, 17 Drawing Sheets

(51) Int. Cl.
*A63F 13/25* (2014.01)
*A63F 13/80* (2014.01)
*A63F 13/92* (2014.01)
*G06T 13/20* (2011.01)
*G09B 19/00* (2006.01)

(56) References Cited

U.S. PATENT DOCUMENTS

| | | | | |
|---|---|---|---|---|
| 5,407,201 A * | 4/1995 | Whitehurst | ............ | A63F 9/12 |
| | | | | 273/153 P |
| 5,619,630 A | 4/1997 | Minami et al. | | |
| 6,145,837 A * | 11/2000 | Silvey | ............ | A63F 9/12 |
| | | | | 273/157 R |
| 6,741,245 B1 * | 5/2004 | Marks | ............ | A63H 33/042 |
| | | | | 345/420 |
| 7,755,620 B2 * | 7/2010 | Scherer | ............ | A63H 9/00 |
| | | | | 345/420 |
| 2005/0026537 A1 * | 2/2005 | Hsieh | ............ | A63H 33/08 |
| | | | | 446/330 |
| 2005/0104298 A1 * | 5/2005 | Butcher | ............ | A63F 9/0073 |
| | | | | 273/450 |
| 2005/0164595 A1 * | 7/2005 | Toht | ............ | A63H 33/046 |
| | | | | 446/92 |
| 2005/0230910 A1 * | 10/2005 | Urriza | ............ | A63F 9/12 |
| | | | | 273/160 |
| 2006/0001212 A1 * | 1/2006 | Toland | ............ | A63F 9/12 |
| | | | | 273/156 |
| 2006/0136180 A1 * | 6/2006 | Hansen | ............ | G06F 17/50 |
| | | | | 703/1 |
| 2006/0258447 A1 * | 11/2006 | Baszucki | ............ | A63F 13/12 |
| | | | | 463/31 |
| 2007/0018973 A1 | 1/2007 | Shih et al. | | |
| 2007/0063997 A1 * | 3/2007 | Scherer | ............ | A63H 9/00 |
| | | | | 345/419 |
| 2007/0262984 A1 * | 11/2007 | Pruss | ............ | G06T 19/20 |
| | | | | 345/420 |
| 2008/0088620 A1 | 4/2008 | Shih et al. | | |
| 2008/0131850 A1 | 6/2008 | Danenberg | | |
| 2008/0237991 A1 * | 10/2008 | Paul | ............ | A63F 9/26 |
| | | | | 273/450 |
| 2009/0029771 A1 * | 1/2009 | Donahue | ............ | A63F 13/10 |
| | | | | 463/31 |
| 2009/0197658 A1 * | 8/2009 | Polchin | ............ | A63F 13/02 |
| | | | | 463/9 |
| 2009/0197678 A1 * | 8/2009 | Huang | ............ | A63H 33/26 |
| | | | | 463/32 |
| 2009/0305204 A1 | 12/2009 | Connolly et al. | | |
| 2010/0062857 A1 | 3/2010 | Kert et al. | | |
| 2011/0074833 A1 * | 3/2011 | Murayama | ............ | A63H 33/042 |
| | | | | 345/690 |
| 2011/0102434 A1 | 5/2011 | Tarr et al. | | |
| 2012/0128365 A1 * | 5/2012 | Paek | ............ | H04B 10/116 |
| | | | | 398/118 |
| 2012/0238365 A1 | 9/2012 | Gaiba et al. | | |
| 2012/0258436 A1 * | 10/2012 | Lee | ............ | G09B 19/00 |
| | | | | 434/362 |
| 2014/0004870 A1 | 1/2014 | Alberi-Morel et al. | | |
| 2014/0084545 A1 * | 3/2014 | Taylor | ............ | G09B 1/38 |
| | | | | 273/456 |
| 2014/0088941 A1 | 3/2014 | Banerjee et al. | | |
| 2014/0118357 A1 | 5/2014 | Covington | | |
| 2014/0212860 A1 | 7/2014 | Bai et al. | | |
| 2015/0141104 A1 * | 5/2015 | Lapstun | ............ | A63F 13/005 |
| | | | | 463/9 |
| 2015/0220663 A1 * | 8/2015 | Capriola | ............ | G06F 17/5004 |
| | | | | 710/8 |
| 2015/0316980 A1 | 11/2015 | Miller | | |
| 2016/0025978 A1 | 1/2016 | Mallinson | | |
| 2016/0059131 A1 | 3/2016 | Ye et al. | | |
| 2016/0100034 A1 | 4/2016 | Miller | | |
| 2016/0189334 A1 | 6/2016 | Mason | | |
| 2016/0189427 A1 | 6/2016 | Wu et al. | | |
| 2016/0209658 A1 | 7/2016 | Zalewski | | |
| 2016/0232715 A1 | 8/2016 | Lee | | |
| 2016/0243448 A1 | 8/2016 | Zhu | | |

OTHER PUBLICATIONS https://www.youtube.com/watch?v=CbwIJMz9PAQ, "Osmo. Play beyond the Screen". 1:51 minutes, Published May 22, 2014 (Year: 2014).*
https://gigaom.com/2014/05/22/the-ipads-next-killer-app-osnno-connects-ios-kids-games-with-the-real-world/, Janko Roettgers, May 22, 2014, pdf article (Year: 2014).*
International Search Report and Written Opinion of the International Searching Authority, PCT/US2017/050480, dated Dec. 28, 2017, 26 pages.
Blocks Rock! web page for 2-D game, http://blocksrock.com/product (accessed Sep. 26, 2017).
Blocks Rock! sales information for 2-D game, http://blocksrock.com/assets/img/feature-block-images/BlocksRock_SalesSheetCompatibility-Mode.pdf (accessed Sep. 26, 2017).
Bricks4All—Tutorials, MOC's and More!, MOC / Tutorial—How to create a LEGO Animation and MOC with LEGO Digital Designer & Blender, https://www.youtube.com/watch?v=xR8WXsJKhss, Aug. 12, 2016, 1 pg.
Halli Galli (1990), https://www.boardgamegeek.com/boardgame/2944/halli-galli, 3 pgs.
Harper Wallace, Trivia Bowl Buzzer 4+ Apple App Store, https://apps.apple.com/us/app/trivia-bowl-buzzer/id1078581252, Sep. 6, 2016, 5 pgs.

* cited by examiner

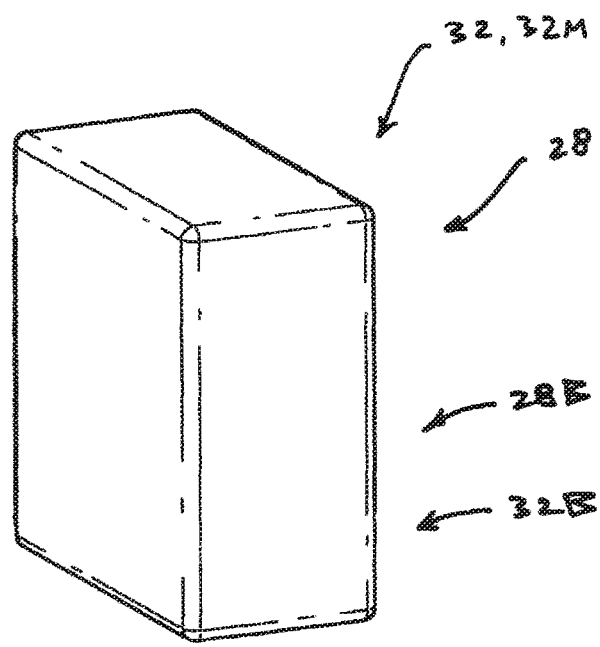
Fig. 16
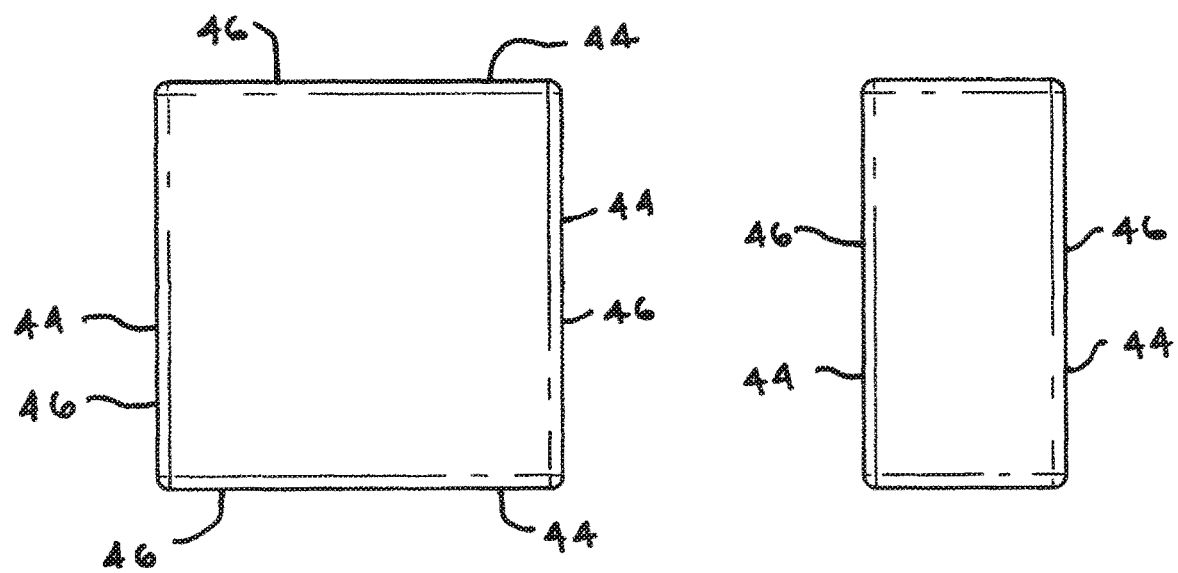
Fig. 17  Fig. 18

METHOD OF AND SYSTEM FOR FACILITATING STRUCTURED BLOCK PLAY

BACKGROUND

The present invention relates to block building activities, particularly structured block play, and more particularly to methods of, and systems for facilitating, structured block play, including competitive structured block play.

It is increasingly recognized as important for children to attain more advanced levels of competence in STEM (science, technology, engineering and math) fields, particularly in view of the relevance of these areas to economic competiveness and national security. Despite the promising amount of growth for the STEM fields, employers have expressed concern that the number of qualified employees may be insufficient to meet future demand. One potential answer to this concern is to engage children in spatial thinking early, for research has shown that spatial thinking plays a critical role in an individual's STEM success. Research as far back as Bingham's 1937 Aptitudes and Aptitude Testing reported that one's abilities in spatial thinking can be associated with success in occupations and tasks related to engineering, science, and fields of mathematics.

Play is an important way that young children learn, and playing with spatial toys and engaging in spatial activities may prove to be an essential part of the development of spatial thinking. Block play, in particular, has received much attention in terms of its potential link to spatial thinking, and has been shown to impact spatial ability in children. In a recent study that examined 847 four to seven year-olds it was found that spatial play including block building and playing with puzzles and board games was associated with increased spatial ability.

There are at least two key types of spatial skills closely relate to block building. The first is spatial visualization, which involves mentally combining objects to produce designs. As an individual is working with blocks, he or she is mentally visualizing how blocks will fit and interact with one another. Another spatial skill related to block building is mental rotation, which involves mentally visualizing what an object will look like after it is rotated. Evidence exists that suggests a strong relationship between spatial and mathematical abilities. Studies have found that performance on spatial tasks like mental rotation is correlated with math achievement in school age children, and that visuospatial working memory is related to number and mathematical problem-solving.

Although many preschool and elementary programs as well as homes have block toys, how these toys are played with has an impact on whether and how spatial skills are developed. Two types of block play are free block play in which children are provided blocks and they create designs, and structured block play in which children are provided blocks and they copy a model of a structure.

In structured block play, a pre-defined model of an assembly or arrangement of model blocks is analyzed by the user. Usually, the model blocks are not tangible blocks, but are instead visual representations of model blocks in a predefined arrangement. Hence, a typical model for structured block play is an image representing a predefined arrangement of model blocks. It is structured block play that requires analysis of a spatial representation and that may result in more significant improvements in spatial ability. Structured block play is thought to develop skills in estimation, measurement, patterning, part-whole relations, visualization, symmetry, transformation and balance. Arguably, while classrooms may have block building activities, there is not enough structured block play for children to greatly enhance spatial learning; some researchers suggest that systematically including structured block play in the early childhood classroom could further develop spatial reasoning.

Blocks Rock!™, a commercially-available competitive block building game available from Blocks Rock! LLC, 733 S. West Street, Indianapolis, Ind. 46225 USA (www.blocksrockgame.com; www.blocksrock.com), is a speeded, structured block building system in the form of a game in which two or more players (preferably of at least age six) race to complete their respective replications of predefined models using identical sets of wooden replication blocks. In Blocks Rock!™, the models are images shown on cards that represent two-dimensional (2-D) arrangements of component model blocks.

The set of replication blocks included in Blocks Rock!™ is a variety of rectangular, square and triangular prisms of different sizes and/or colors: blue, red, yellow, green and purple, with each color corresponding to a particular block shape or size. Specifically, Blocks Rock!™ includes 24 of the following replication blocks in their parenthetically indicated quantities, each type defined by a particular combination of shape and color:

A. Green triangular prisms (4);
    B. Red square prisms (4);
    C. Yellow square prisms (4);
    D. Small, purple rectangular prisms (8); and
    E. Large, blue rectangular prisms (4).

The replication block types represent corresponding component model block types used in each depicted model. The models depicted on the cards each use no more than ½ of each of the above-described replication block types. Therefore, in Blocks Rock!™, one full set of 24 replication blocks accommodates play between two players, with the players provided with identical sets of 12 replication blocks which they position in a plane, as along or vertically upward from a tabletop, to manually assemble his or her replication of the 2-D model. As used herein, to "manually" assemble a replication means to position replication blocks through direct contact with a player's hand.

The rules of the Blocks Rock!™ game call for the players to take turns flipping over a card, and then concurrently position replication blocks of their respective replication block sets in a race against each other to build their respective replications of the 2-D model shown on the card. The first player to finish his or her replication rings a call bell to audibly signal its completion, and wins the round. If that player's replication is not accurate, the round is still in play, with either player having the option to continue positioning replication blocks to complete an accurate replication, ring the bell, and win the round. Ringing the bell is an enjoyable part of the game for most young children. The player winning the round collects the card displaying the image. Cards depicting certain models may have relatively greater or lesser point values than cards depicting other models, and at the end of the game each player adds up the points on his or her collected cards, with the winner having the highest total number of points. Alternatively, as when a player is too young to add points, the winner is the person with the most collected cards at the end of the game. Blocks Rock!™ thus facilitates competitive structured block play, which encourages not only accuracy but speed in analyzing and then replicating the structures represented by the predefined models.

As used herein, "competitive" structured block play means that the activity is a contest between two or more players pitted against each other in a race to concurrently build their respective replications and be the first to finish an accurate replication of the model. Compared to structured block play designed as a timed contest between two or more players each separately and independently racing against a clock (e.g., a stopwatch) to finish his or her replication in the comparatively shortest time, competitive structured block play between two or more players forces rapid play and is believed to better enhance related brain activity.

Structured block building games or systems like Blocks Rock!™ are thought to improve a number of visuospatial skills including patterning and visualization, and a strong relationship between spatial processing ability and mathematical competency has been shown in studies. A recent study supports the hypothesis that competitive structured block play with the game Blocks Rock!™ can result in improvement in spatial ability, and that such improvement would be evident in a mental rotation task as well as a visuospatial problem-solving task, the Tower of London. The Tower of London is a well-known test used in applied clinical neuropsychology for the assessment of executive functioning. This study found that block play with the use of the game Blocks Rock!™ significantly improved performance on the Tower of London test.

While there has been some debate in the literature regarding whether training on one visuospatial task transfers to other tasks, studies have suggested that they can. In one study of seven and eight year-old subjects, training on Blocks Rock!™ for five days, for 30 minutes per day, resulted in not only transfer to mental rotation but also to both visuospatial and mathematical problem-solving. Given the importance of spatial thinking to success in STEM fields, activities involving structured block play, and particularly competitive structured block play, may prove to be important for helping to set a solid foundation in these areas.

It is therefore desirable to provide methods of, and systems for facilitating, structured block play, and particularly competitive block play, in ways that introduce additional challenges to users and will continue to appeal to children as they grow.

SUMMARY

One way of introducing additional challenges is to increase the complexity of the model to be replicated. The present invention seeks to do this by facilitating the use of three-dimensional (3-D) models for replication.

The invention includes, in one form thereof, a system for facilitating structured block play. The system includes a set of images providing a spatial representation of a predefined 3-D arrangement of blocks for analysis by a user, a set of blocks configured to be positioned by the user into a replication of the predefined 3-D arrangement, and an indicator for signaling the user's completion of the replication.

In some embodiments of the system, the set of images is adapted for electronic display.

In some embodiments of the system, the set of blocks is tangible and configured to be manually positioned by the user.

In some embodiments of the system, the set of blocks is configured to be positioned with the user's hand.

In some embodiments of the system, each block of the set of blocks is a computer-generated representation of a physical block adapted to be positioned through the user's manipulation of a computer input device, and the replication is a computer-generated replication adapted for electronic display.

In some embodiments of the system, the indicator is actuable by the user through manipulation of a computer input device.

In some embodiments of the system, the indicator is manually-actuable by the user.

In some embodiments of the system, actuation of the indicator causes production of an audible signal.

In some embodiments of the system, the indicator is a bell.

In some embodiments of the system, actuation of the indicator causes production of a visual signal.

In some embodiments of the system, the positioning of the blocks includes vertically stacking at least a first block and a second block, the second block relatively lower than and supported by the first block.

In some embodiments of the system, the set of blocks includes a plurality of blocks that are magnetically attracted to each other.

In some embodiments of the system, at least one of the plurality of blocks includes a magnet.

In some embodiments of the system, at least one of the plurality of blocks has a surface defined by a magnet.

In some embodiments of the system, each of the plurality of blocks includes a magnet.

In some embodiments of the system, first and second blocks of the plurality of blocks are configured to be positionable in a vertical relationship with the relatively lower one of the first and second blocks magnetically coupled to and projecting generally vertically from the relatively higher one of the first and second blocks.

In some embodiments of the system, first and second blocks of the plurality of blocks are configured to be positionable in a horizontal relationship with one of the first and second blocks magnetically coupled to and projecting generally horizontally from the other of the first and second blocks.

In some embodiments of the system, at least one image of the set of images is an animated image, and a changing view of the predefined 3-D arrangement of blocks that changes in real time is provided by the animated image.

In some embodiments of the system, a rotating view of the predefined 3-D arrangement of blocks is provided by the animated image.

In some embodiments of the system, an exploding view of the predefined 3-D arrangement is provided by the animated image.

In some embodiments of the system, a view of the predefined 3-D arrangement in at least one expanded state in which the blocks of the predefined 3-D arrangement are shown separated from each other is provided by the animated image.

In some embodiments of the system, a rotating view and an exploding view of the predefined 3-D arrangement are provided by the animated image.

In some embodiments of the system, cyclically repeating views of the predefined 3-D arrangement are provided by the animated image.

In some embodiments of the system, replication of the predefined 3-D arrangement by each of two or more users in competitive structured block play including a race between the users to complete their respective, concurrently constructed replications is facilitated.

In some embodiments of the system, replication of the predefined 3-D arrangement by a user in structured block play including an individual race against a clock to complete the user's respective replication is facilitated.

In some embodiments of the system, the facilitated structured block play includes two or more users each in an individual race against a clock to complete the user's respective replication in a comparatively shorter time.

The invention includes, in another form thereof, a system for facilitating structured block play. The system includes a set of images providing a spatial representation of a predefined 3-D arrangement of blocks for analysis by a user, and a set of blocks configured to be positioned by the user into a replication of the predefined 3-D arrangement. Replication of the predefined 3-D arrangement by each of two or more users in competitive structured block play including a race between the users to concurrently complete their respective replications is facilitated.

In some embodiments of the system, the set of images is adapted for electronic display.

In some embodiments of the system, the set of blocks is tangible and configured to be manually positioned by the user.

In some embodiments of the system, the set of blocks is configured to be positioned with the user's hand.

In some embodiments of the system, each block of the set of blocks is a computer-generated representation of a physical block adapted to be positioned through the user's manipulation of a computer input device, and the replication is a computer-generated replication adapted for electronic display.

Some embodiments of the system include a user-actuable indicator adapted to generate upon actuation a signal indicative of a user's completion of the respective replication, and the indicator is actuable by the user through manipulation of a computer input device.

Some embodiments of the system include a user-actuable indicator adapted to generate upon actuation a signal indicative of a user's completion of the respective replication.

In some embodiments of the system, the indicator is manually-actuable by the user.

In some embodiments of the system, actuation of the indicator causes production of an audible signal.

In some embodiments of the system, the indicator is a bell.

In some embodiments of the system, actuation of the indicator causes production of a visual signal.

In some embodiments of the system, the positioning of the blocks includes vertically stacking at least a first block and a second block, the second block relatively lower than and supported by the first block.

In some embodiments of the system, the set of blocks includes a plurality of blocks that are magnetically attracted to each other.

In some embodiments of the system, at least one of the plurality of blocks includes a magnet.

In some embodiments of the system, at least one of the plurality of blocks has a surface defined by a magnet.

In some embodiments of the system, each of the plurality of blocks includes a magnet.

In some embodiments of the system, first and second blocks of the plurality of blocks are configured to be positionable in a vertical relationship with the relatively lower one of the first and second blocks magnetically coupled to and projecting generally vertically from the relatively higher one of the first and second blocks.

In some embodiments of the system, first and second blocks of the plurality of blocks are configured to be positionable in a horizontal relationship with one of the first and second blocks magnetically coupled to and projecting generally horizontally from the other of the first and second blocks.

In some embodiments of the system, at least one image of the set of images is an animated image, and a changing view of the predefined 3-D arrangement of blocks that changes in real time is provided by the animated image.

In some embodiments of the system, a rotating view of the predefined 3-D arrangement of blocks is provided by the animated image.

In some embodiments of the system, an exploding view of the predefined 3-D arrangement is provided by the animated image.

In some embodiments of the system, a view of the predefined 3-D arrangement in at least one expanded state in which the blocks of the predefined 3-D arrangement are shown separated from each other is provided by the animated image.

In some embodiments of the system, a rotating view and an exploding view of the predefined 3-D arrangement are provided by the animated image.

In some embodiments of the system, cyclically repeating views of the predefined 3-D arrangement are provided by the animated image.

The invention includes, in yet another form thereof, a system for facilitating structured block play in which at least some of a set of blocks are positioned by a user into a replication of a predefined 3-D arrangement of blocks. The system includes a set of images adapted for electronic display. The set of images provides a spatial representation of the predefined 3-D arrangement of blocks, and includes at least one animated image providing a changing view of the predefined 3-D arrangement of blocks. The animated image provides at least one of a rotating view and an exploding view of the predefined 3-D arrangement of blocks. The system also includes a user-actuable indicator adapted to generate upon actuation a signal indicative of the user's completion of the replication.

In some embodiments of the system, the set of images provides a plurality of static views of the predefined 3-D arrangement of blocks.

In some embodiments of the system, the set of images provides a spatial representation of a predefined 3-D arrangement of differently shaped and/or colored blocks, and the set of blocks includes blocks of corresponding to the shapes and/or colors of the blocks included in the predefined 3-D arrangement of blocks.

The invention includes, in yet another form thereof, a method of structured block play. The method includes: providing a set of images spatially representing a predefined 3-D arrangement of blocks and including at least one animated image; a player analyzing the set of images; the player positioning a set of blocks to replicate the predefined 3-D arrangement of blocks; and the player actuating an indicator to signal completion of the replication.

The invention includes, in yet another form thereof, a method of competitive structured block play. The method includes: providing a set of images spatially representing a predefined 3-D arrangement of blocks and including at least one animated image; each of two or more players analyzing the set of images; and two or more players concurrently replicating the predefined 3-D arrangement in a race to complete respective replications of the predefined 3-D arrangement of blocks by positioning sets of blocks, whereby the players engage in competitive structured block play.

Some embodiments of the method include generating a signal indicative of the first replication completion.

BRIEF DESCRIPTION OF THE DRAWINGS

The above-mentioned aspects and other characteristics and advantages of an apparatus and/or method according to the present disclosure will become more apparent and will be better understood by reference to the following description of exemplary embodiments taken in conjunction with the accompanying drawings, wherein:

FIG. 16 is an isometric view of a second type of component model block or replication block included in the model or replication of FIGS. 3-10;

FIGS. 17 and 18 are orthographic views of the model block or replication block of FIG. 16;

Figure 1:
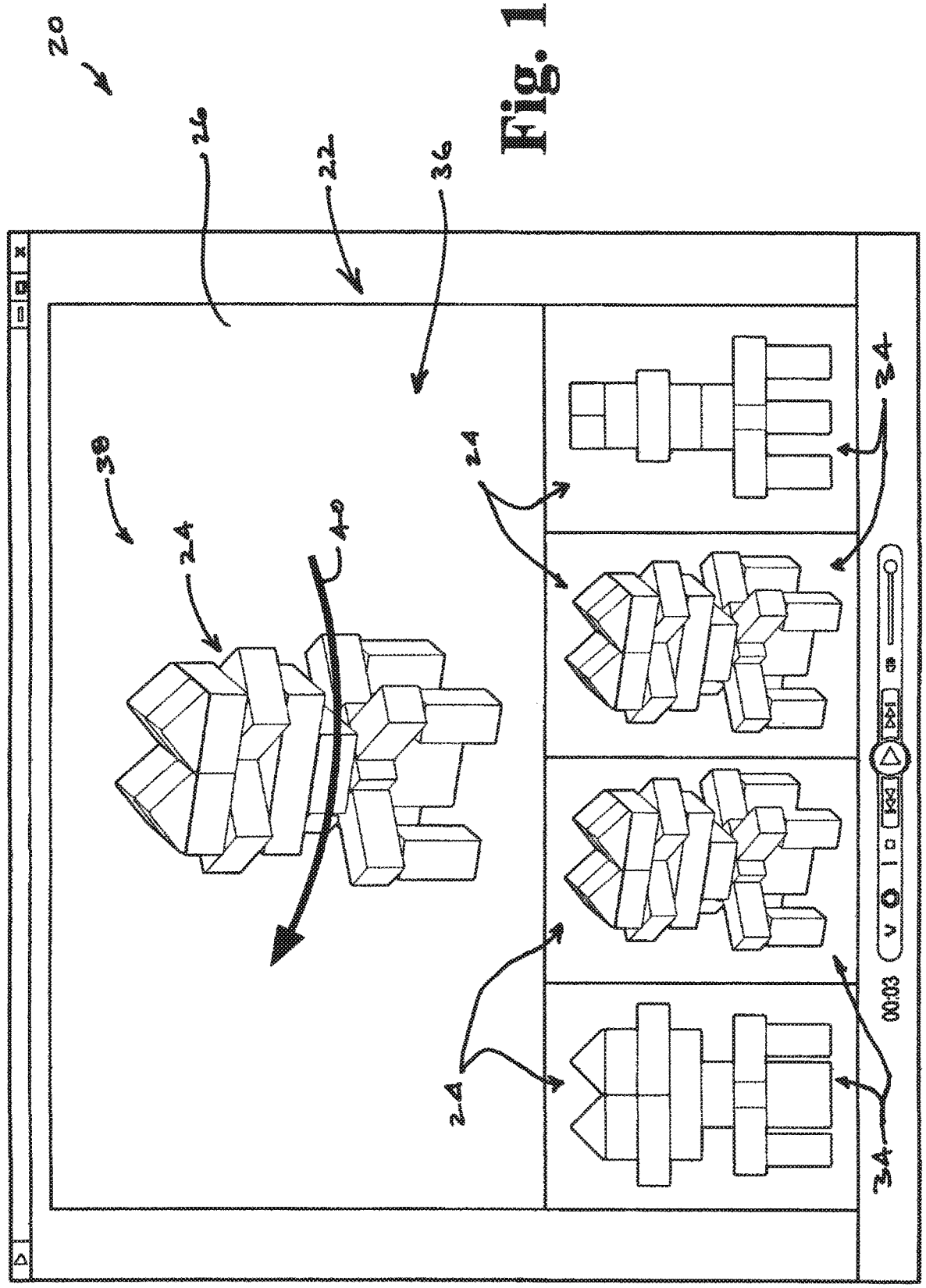
FIG. 1 is a view of a display screen showing a model defined by a set of images of an exemplary embodiment of a predefined 3-D arrangement of component model blocks at a first time during a round of structured block play according to the present disclosure.

Corresponding reference characters indicate corresponding parts throughout the several views. Although the drawings represent an embodiment of the disclosed system and/or method, the drawings are not necessarily to scale or to the same scale, and certain features may be exaggerated in order to better illustrate and explain the present disclosure.

DETAILED DESCRIPTION OF EXEMPLARY EMBODIMENT(S)

The invention is adaptable to various modifications and alternative forms, and the specific embodiments thereof shown by way of example in the drawings is herein described in detail. The exemplary embodiments of the present disclosure are chosen and described so that others skilled in the art may appreciate and understand the principles and practices of the present disclosure. It should be understood, however, that the drawings and detailed description are not intended to limit the invention to the particular forms disclosed, but on the contrary, the intention is to cover all modifications, equivalents and alternatives falling within the spirit and scope of the present invention as defined by the appended claims.

A system for facilitating structured block play according to certain embodiments of the present disclosure has a model defined by a set of images providing a spatial representation of a predefined 3-D arrangement of model blocks for analysis by the user(s). The system also includes a set of replication blocks configured to be positioned by the user into a replication of the predefined 3-D arrangement.

The replication blocks of some embodiments of a system according to the present disclosure are tangible and positioned directly by the user's hand to "manually assemble" the replication, as in Blocks Rock!™. Indeed, the set of replication blocks used in such embodiments may be the selfsame set of 24 manually-positionable replication blocks included in Blocks Rock!™. Utilizing the selfsame set of 24 manually-positionable replication blocks included in Blocks Rock!™ is envisioned to promote the commercialization of apps or internet downloads of software for generating the models to those already owning the Blocks Rock!™ game, who can immediately enjoy embodiments of the system and method involving manual replication. Vendors of apps or downloads for such embodiments may then, to some extent, avoid inventorying and shipping sets of replication blocks.

In other embodiments of the system the replication blocks are intangible and computer-generated, such that the replication is electronically displayed on a display screen of, for example, a video or computer monitor, tablet or smart phone. While it is known to use computer game software (e.g., MINECRAFT®) to produce intangible, computer-generated building blocks, whereby a desired arrangement of blocks created through free or structured block play is electronically displayed on the display screen of a video or computer monitor, tablet or smart phone, such previous uses do not contemplate competitive block play or provide a model for analysis as herein described.

Like Blocks Rock!™, some embodiments of a system for facilitating structured block play according to the present disclosure take the form of a game, and a user of such a system embodiment may be referred to as a player of the game. "Competitive" structured block play in the context of a system or method according to the invention also means that the activity is a contest between two or more players pitted against each other in a race to concurrently build their respective replications and be the first to finish an accurate replication of the model, as discussed above in describing Blocks Rock!™. Thus, some embodiments according to the present disclosure involve two or more players engaging in competitive structured block play whereby, as discussed above, the players concurrently build their respective replications of the predefined model in a race against each other to finish their respective replications. As noted above, by forcing rapid play between players, competitive structured block play is believed to better enhance related brain activity vis-à-vis other types of structured block play designed as timed contests between two or more players each separately and independently racing against a clock to finish his or her replication in the comparatively shortest time, activities that system and method embodiments according to the present disclosure also facilitate.

In certain embodiments the first player to finish his or her replication during competitive structured block play indicates its completion with a signal and, if the replication is accurate, the end of the round. The signal may be audible, such as in Blocks Rock!™, where a call bell serves as a signal-producing indicator actuated by the first-finishing player. An audible signal may alternatively be a sound produced by a buzzer or horn.

In other embodiments, the first player to finish his or her replication during competitive block play may instead indicate its completion with a visual signal, such as by illuminating a lamp or raising a flag. In still other embodiments, the player may himself indicate completion of his replication during competitive block play with an audible or visual signal by, for example, using his voice or raising an arm. Certain embodiments of the system therefore also include an indicator by which a player in a game facilitating competitive structured block play, audibly or visually signals completion of his or her replication. The signal may, for example, be produced by an indicator device or indicated with the player's voice or body movement as described above, whereby in some embodiments the indicator is a physically separable part of the system.

Thus, according to some embodiments, the indicator is a physically separable part of the system, whereas according to other embodiments the indicator is an integral part of the machine providing a computer-generated model and/or the replication blocks. Such a machine may employ an app or other computer program that provides an indicator program executed by actuating a touchscreen or depressing a key or keypad.

Users involved in structured block play according to certain embodiments of the system may, as described above, independently build respective replications of a model as quickly as possible in separate races against the clock, and strive to finish their respective replications in the shortest comparative amount of time as measured by stopwatch, for example. Such timed contests would not, in the context of the present disclosure, be construed as "competitive" structured block play, but are expected to provide some level of the advantages resulting from direct, head-to-head competition. Additionally, such timed contests would beneficially facilitate structured block play between, for example, players located remotely from each other or who must alternatingly use a shared display device too small to accommodate their concurrent analyses of a model.

Figure 2:
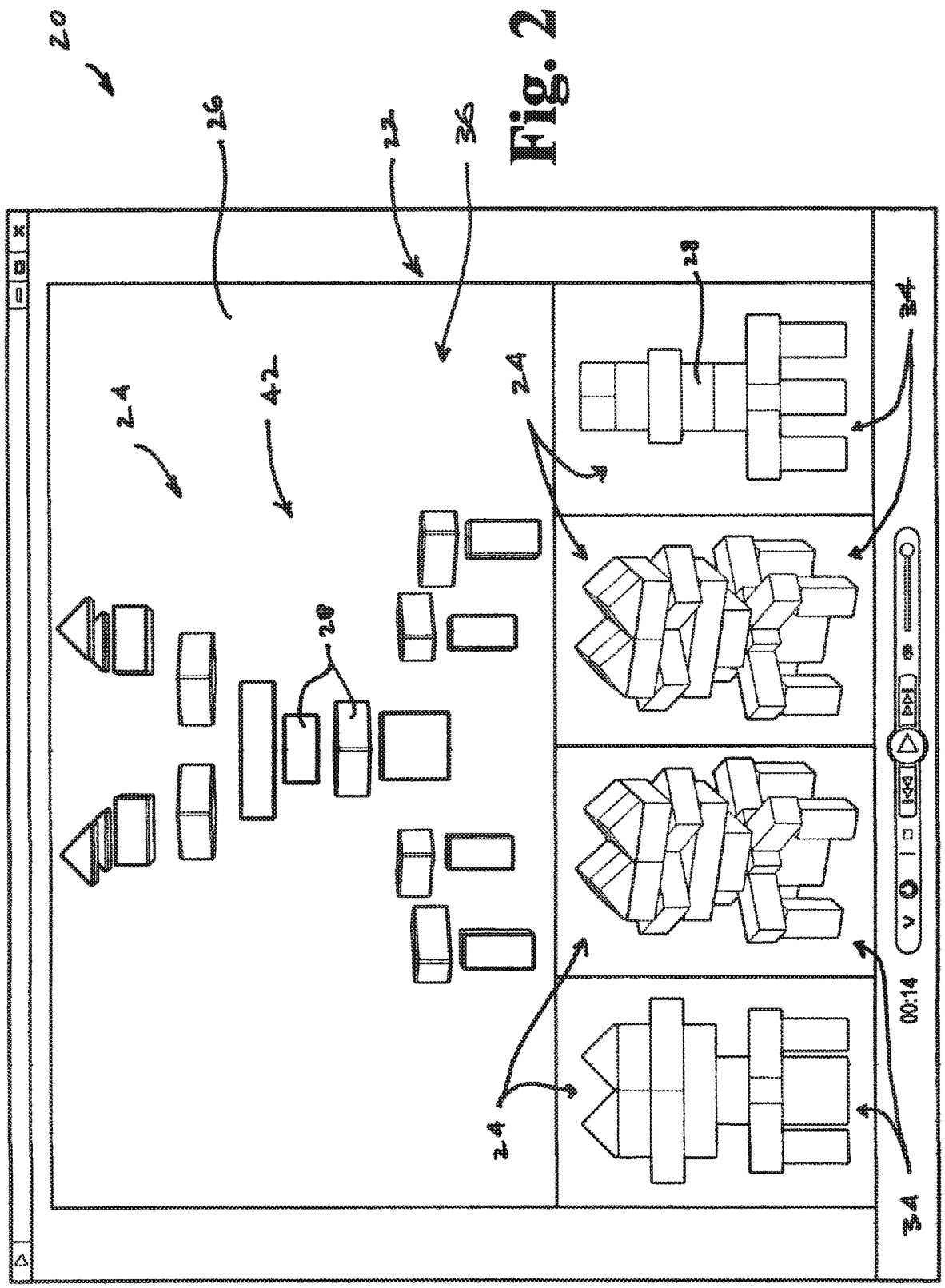
FIG. 2 is another view of the display screen of FIG. 1 at a second time during the round of structured block play according to the present disclosure.

Referring to FIGS. 1 and 2, system embodiment 20 provides an electronic display of a set of images 22 spatially representing a predefined model 24 such as the depicted example model on the display screen 26 of a video or computer monitor, tablet or smart phone. The predefined model 24 is a 3-D arrangement of component model blocks 28 representing a structure. The component model blocks 28 of model 24 define the represented structure and are intangible, computer-generated representations of the differently colored, sized and shaped prisms utilized as replication blocks in Blocks Rock!™ and described above. FIGS. 3-10 show various views of a particular example of 3-D model 24, or a replication 30 thereof, the model 24 or replication 30 respectively defined by a number of different types of component model blocks 28 and replication blocks 32, each representing one of the respective types (types A-E) of the replication blocks in the 24-piece set included in Blocks Rock!™ and described above. It is to be understood, however, that component model blocks 28 and replication blocks 32 according to the present disclosure need not correspond to those of Blocks Rock!™.

Figure 3:
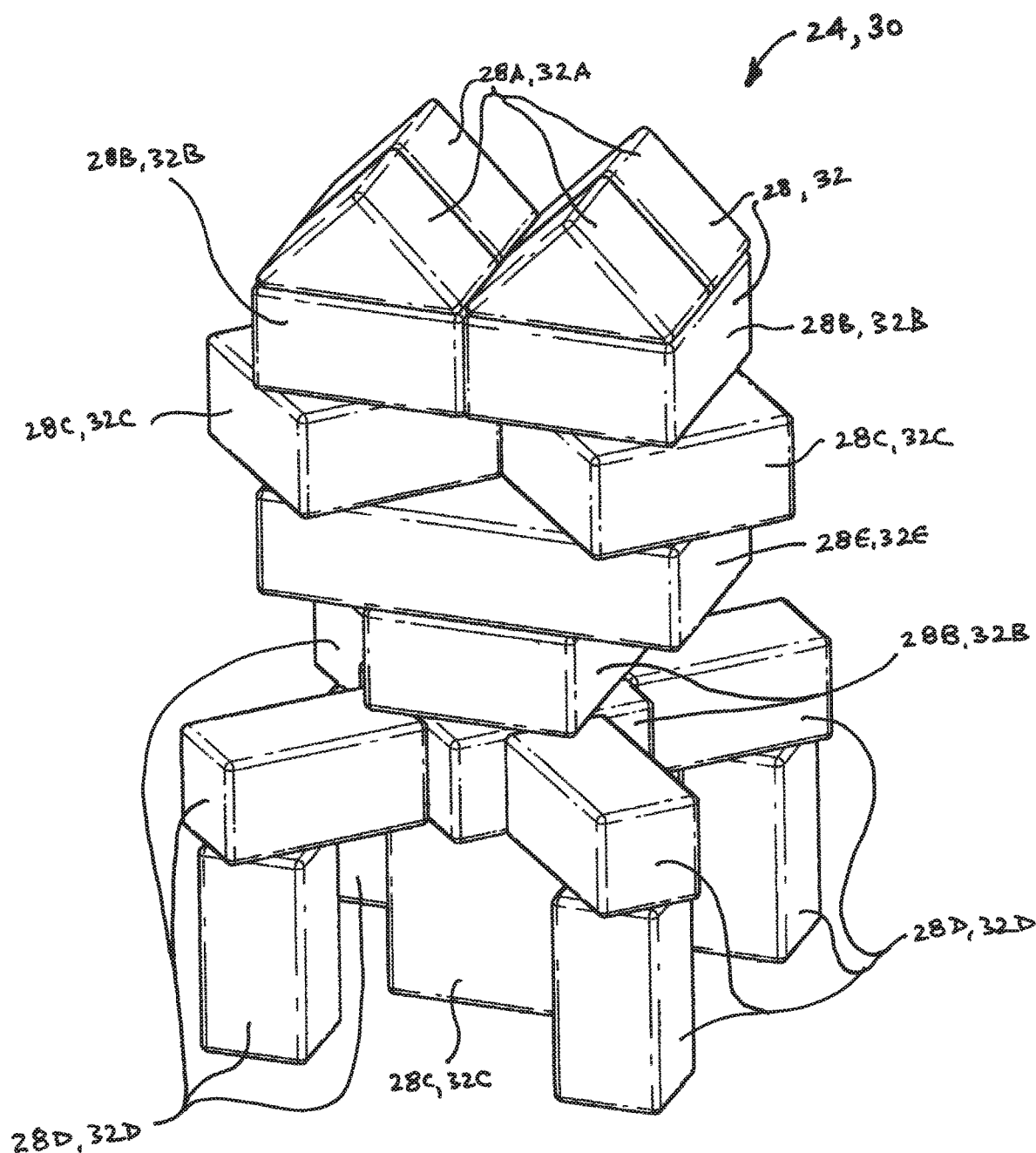
FIG. 3 is an upper right front isometric view of either the model shown in FIGS. 1 and 2, or a replication thereof.
Figure 4:
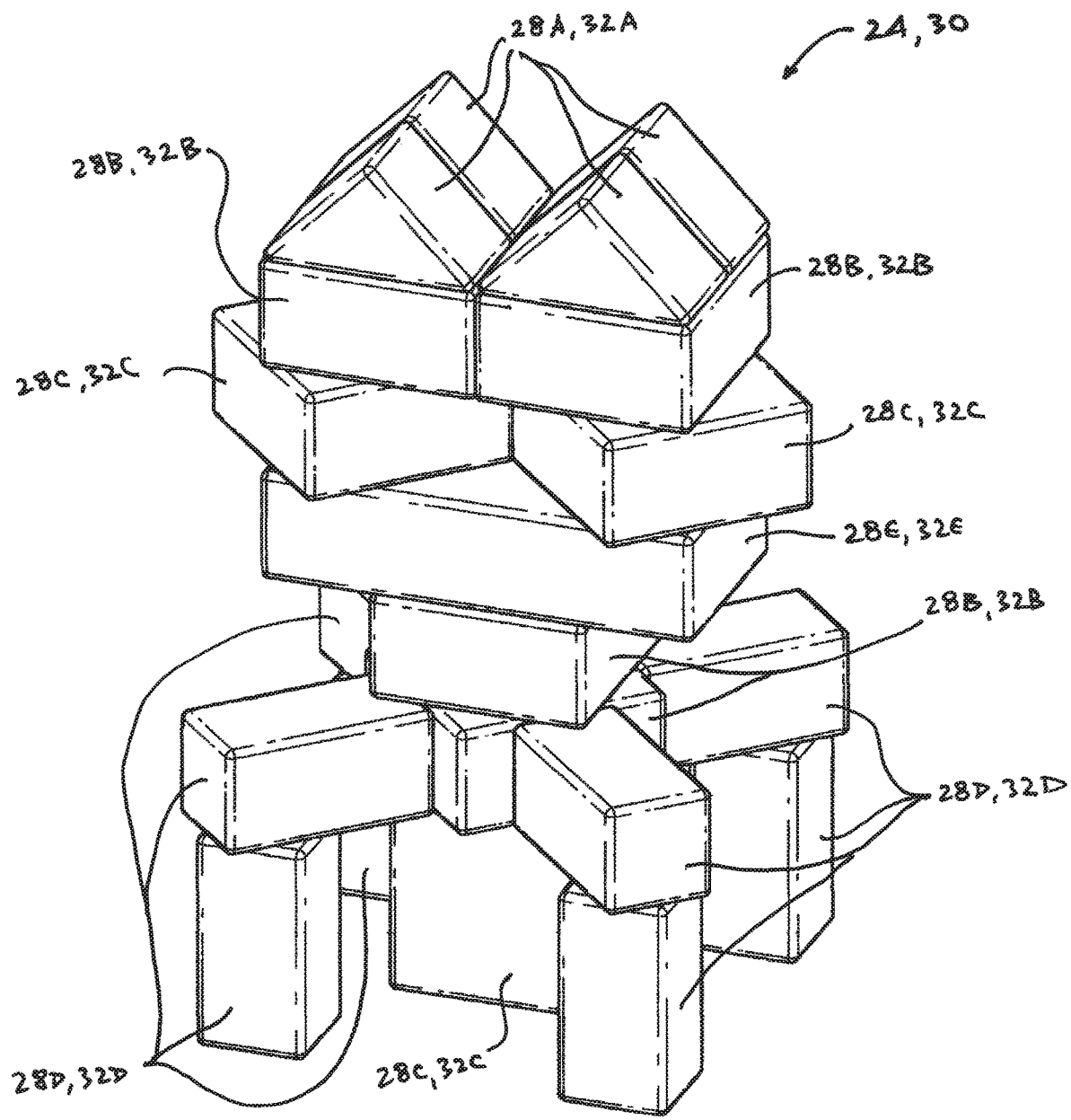
FIG. 4 is an upper left rear isometric view of the model or replication of FIG. 3.
Figure 5:
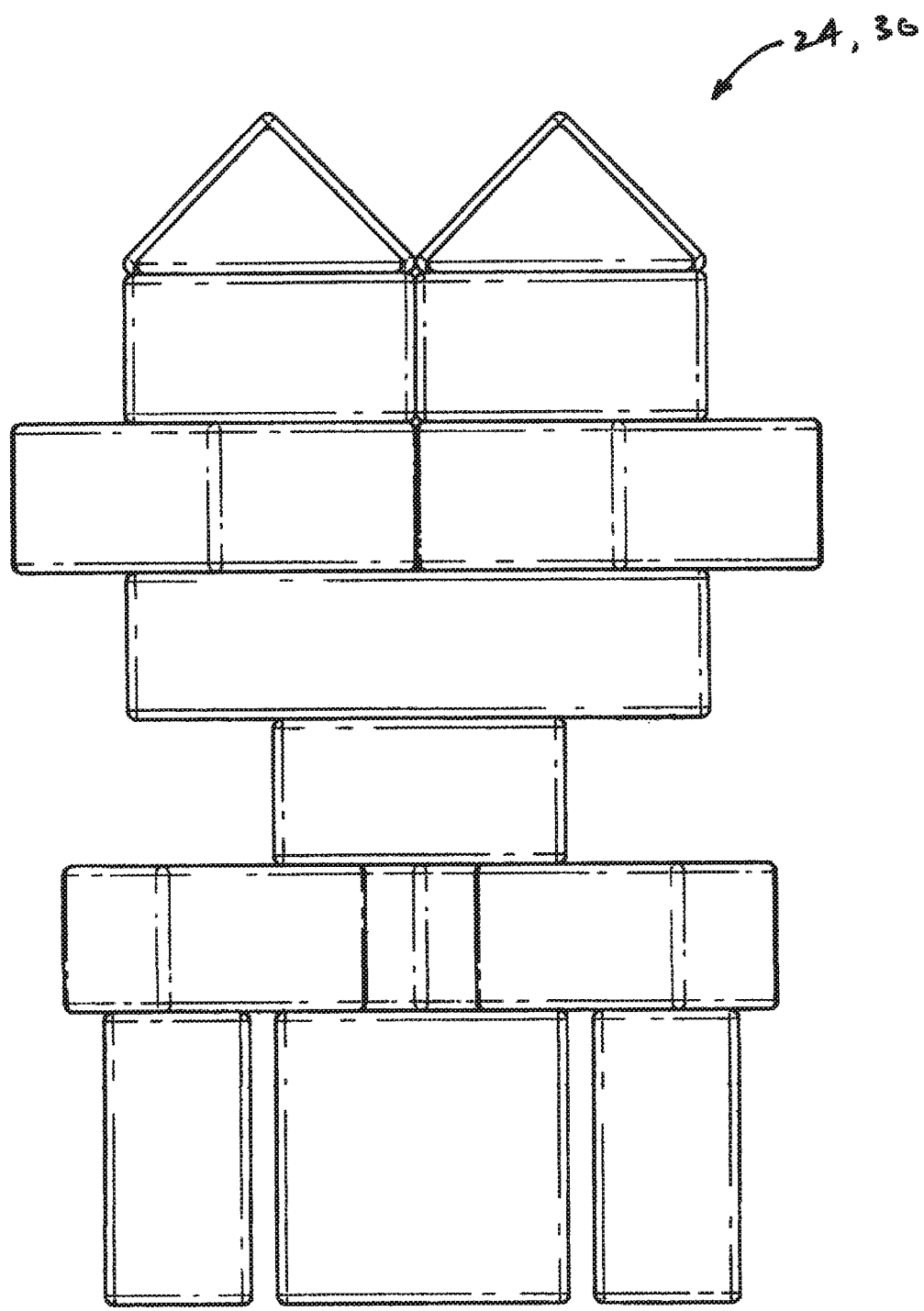
FIG. 5 is a front orthographic view of the model or replication of FIG. 3.
Figure 6:
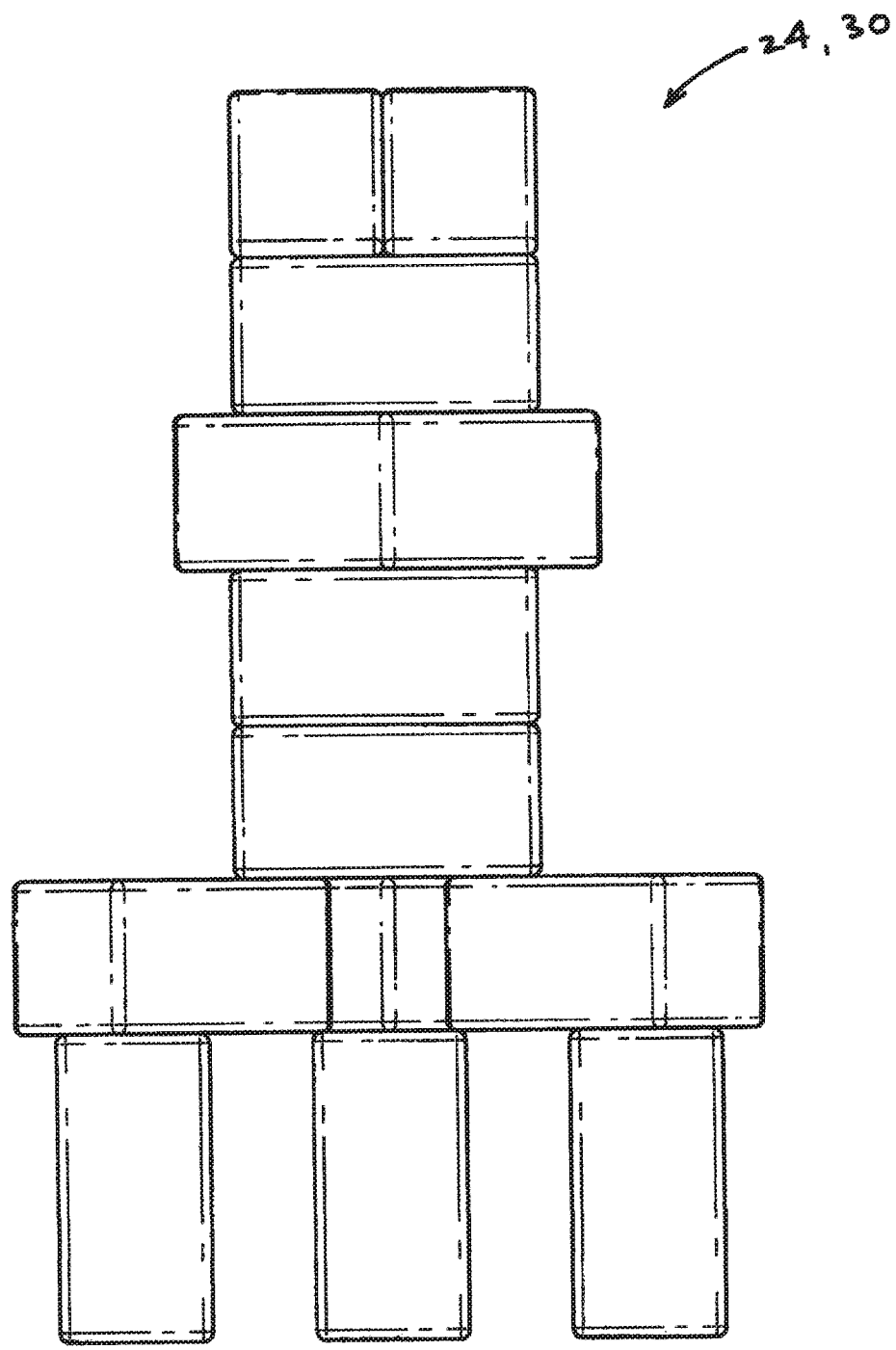
FIG. 6 is a left side orthographic view of the model or replication of FIG. 3.
Figure 7:
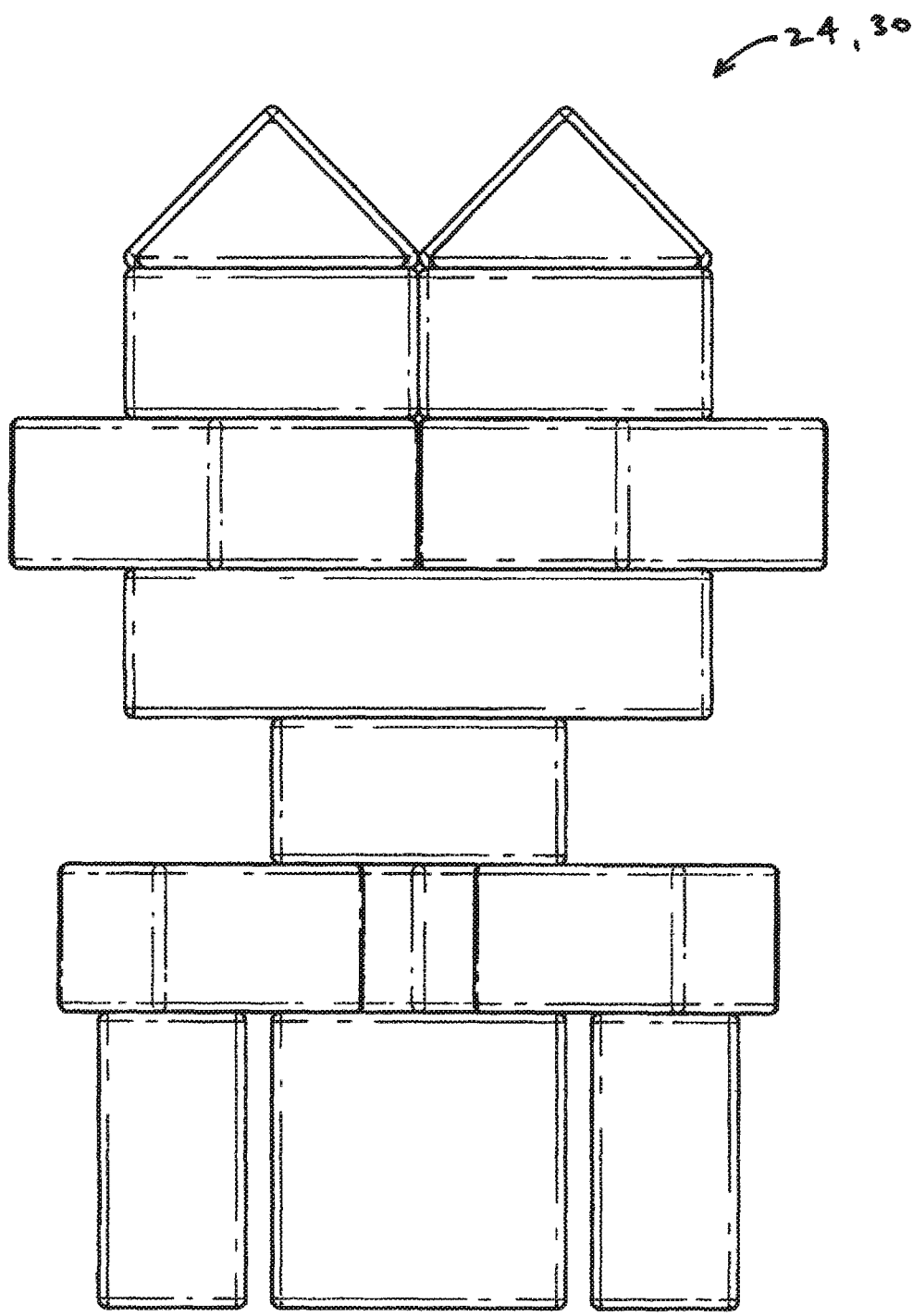
FIG. 7 is a rear orthographic view of the model or replication of FIG. 3.
Figure 8:
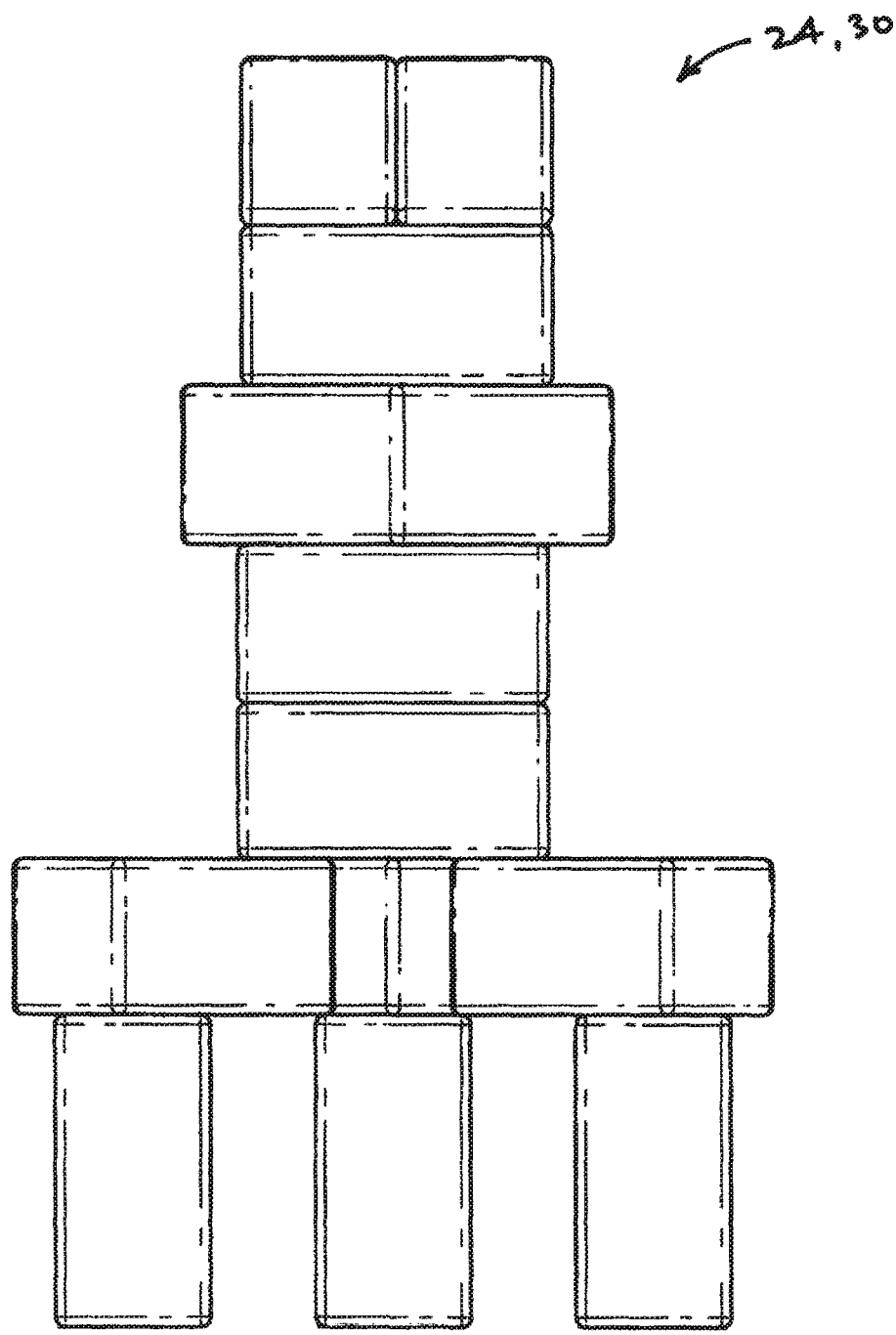
FIG. 8 is a right side orthographic view of the model or replication of FIG. 3.
Figure 9:
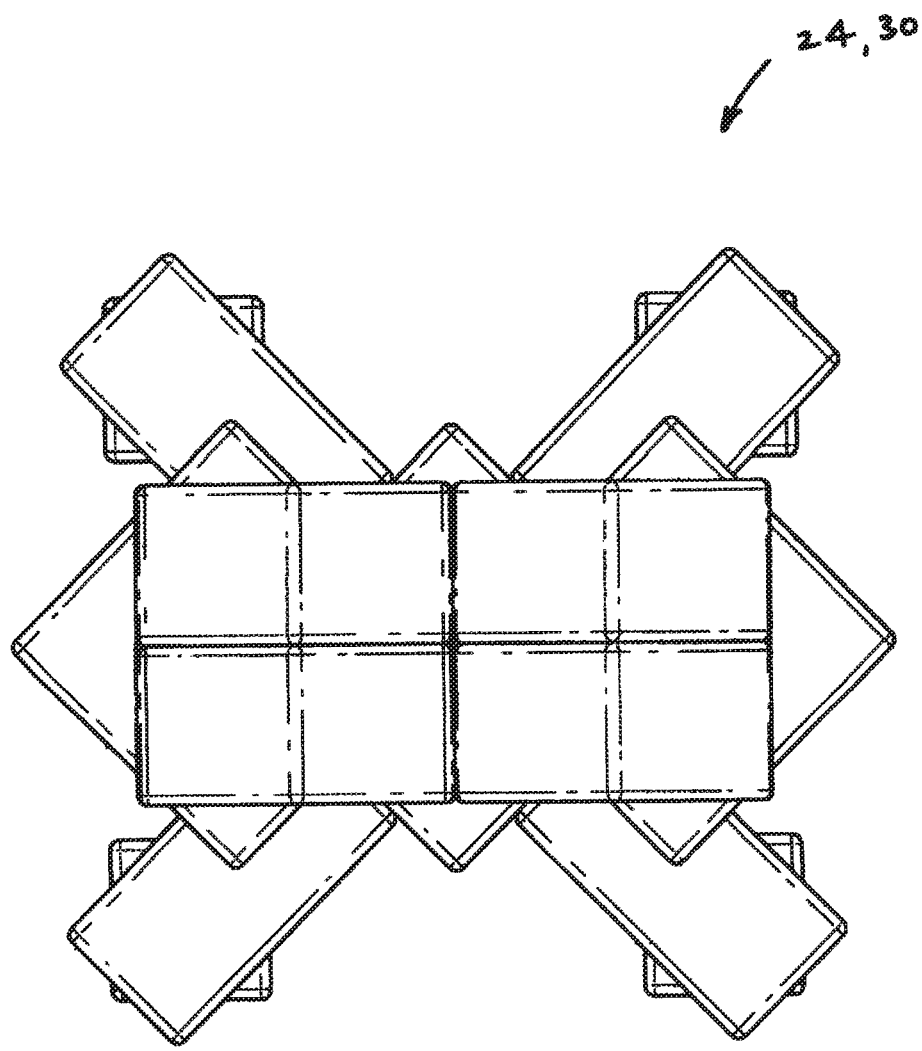
FIG. 9 is a top orthographic view of the model or replication of FIG. 3.
Figure 10:
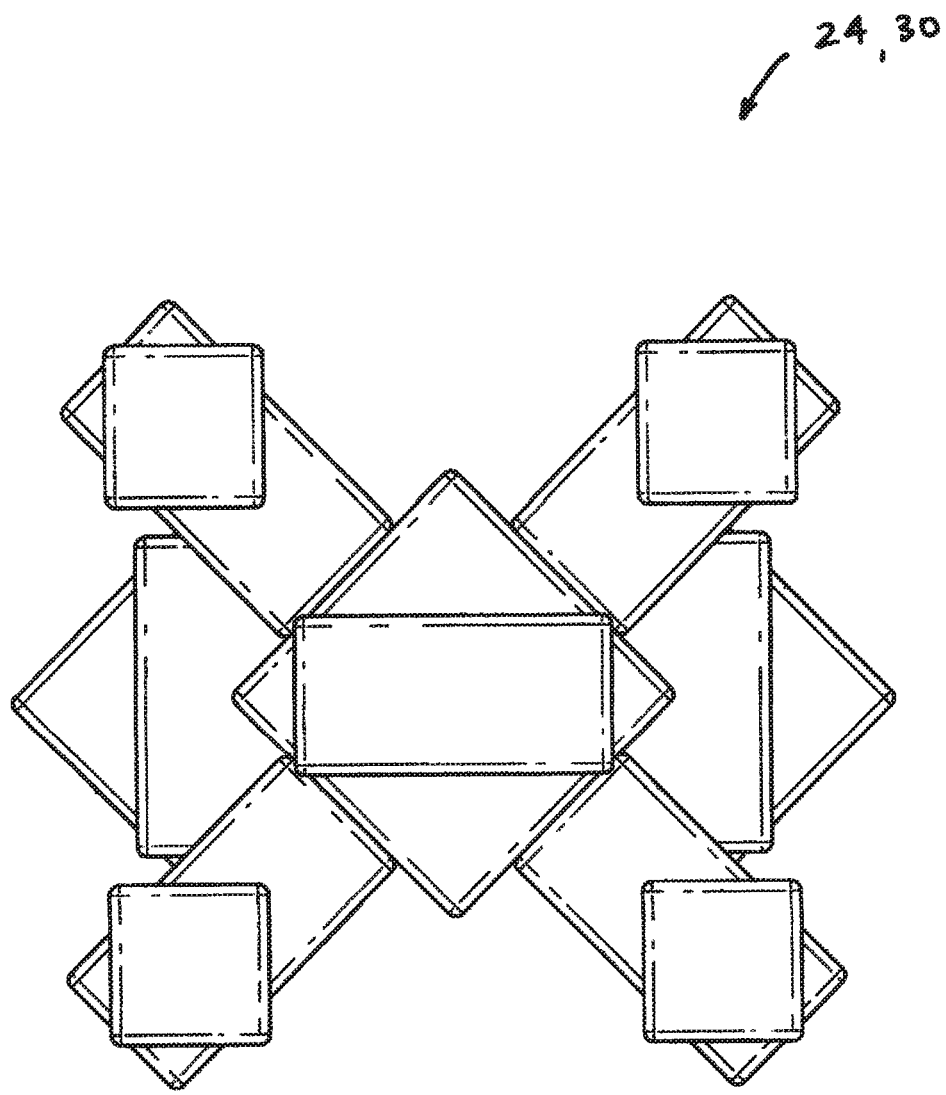
FIG. 10 is a bottom orthographic view of the model or replication of FIG. 3.
Figure 11:
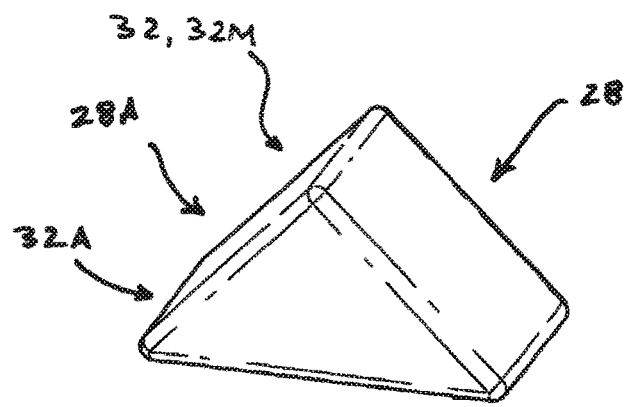
FIG. 11 is an isometric view of a first type of component model block or replication block included in the model or replication of FIGS. 3-10.
Figure 13:
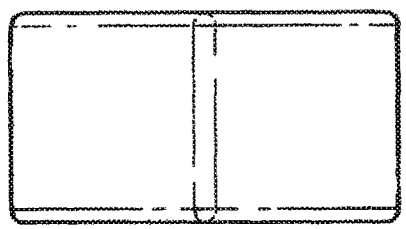
FIGS. 12-15 are orthographic views of the model block or replication block of FIG. 11.
Figure 19:
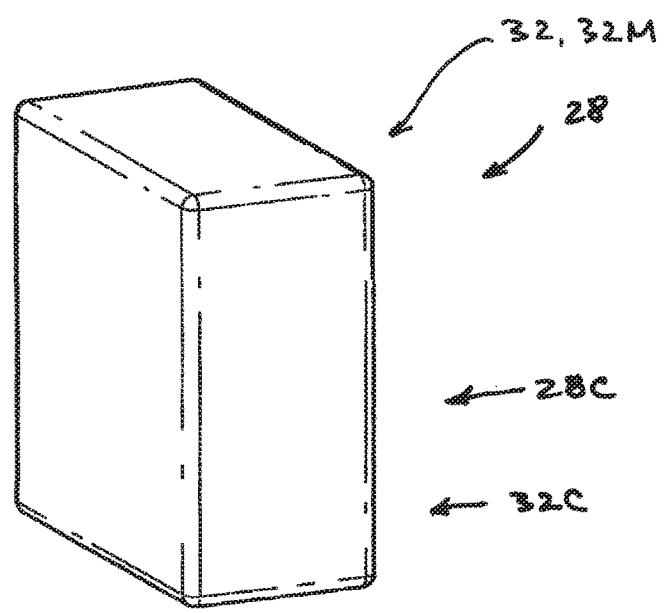
FIG. 19 is an isometric view of a third type of component model block or replication block included in the model or replication of FIGS. 3-10.
Figure 20:
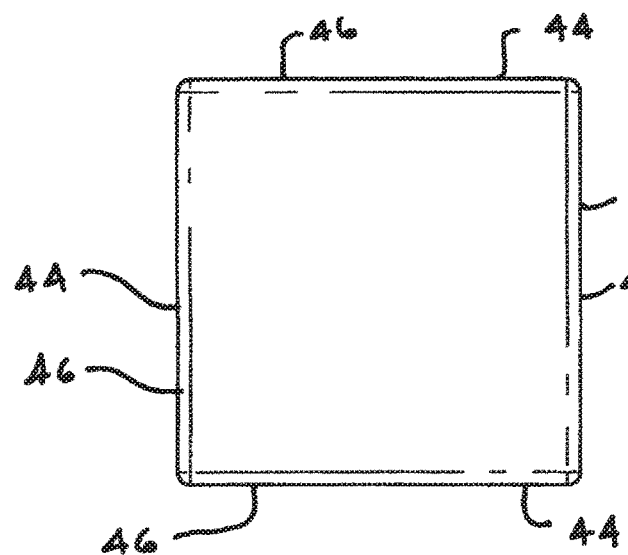
FIGS. 20 and 21 are orthographic views of the model block or replication block of FIG. 19.
Figure 21:
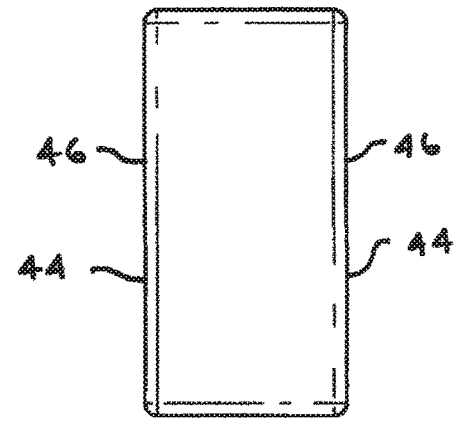
Figure 22:
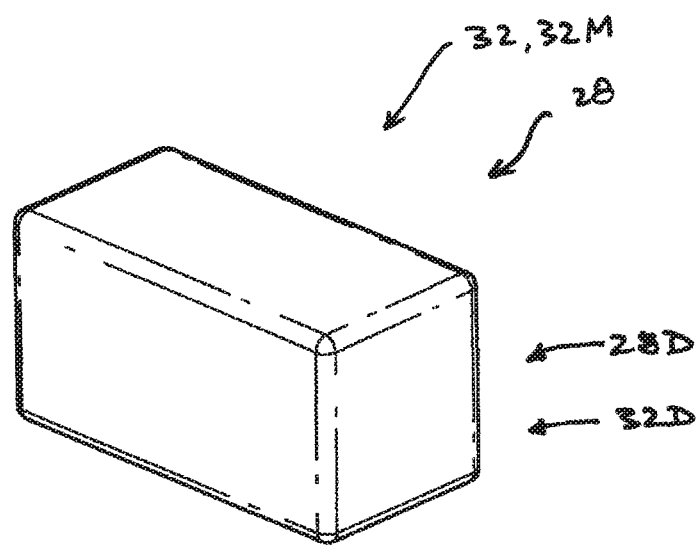
FIG. 22 is an isometric view of a fourth type component model block or replication block included in the model or replication of FIGS. 3-10.
Figures 23, 24:
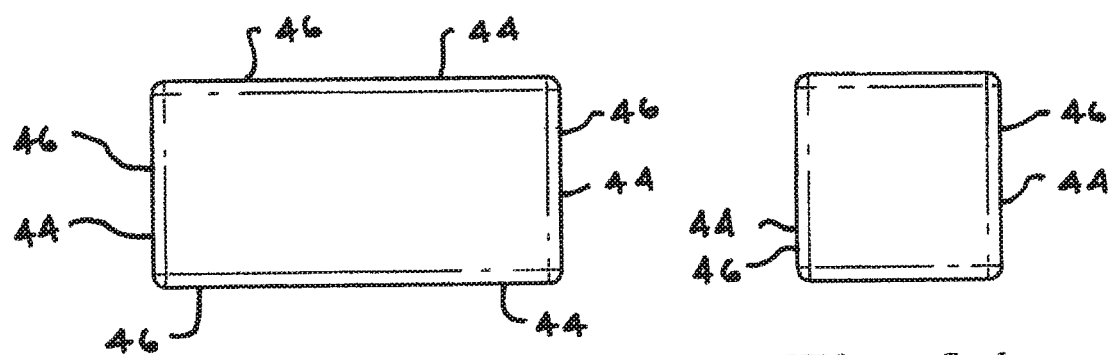
FIGS. 23 and 24 are orthographic views the model block or replication block of FIG. 22.
Figure 25:
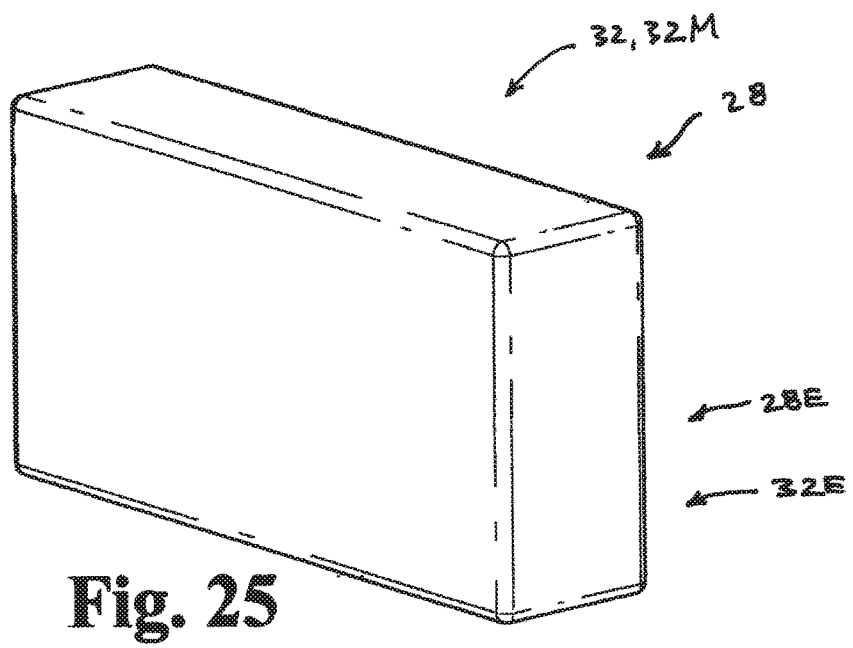
FIG. 25 is an isometric view of a fifth type component model block or replication block included in the model or replication of FIGS. 3-10.
Figure 27:
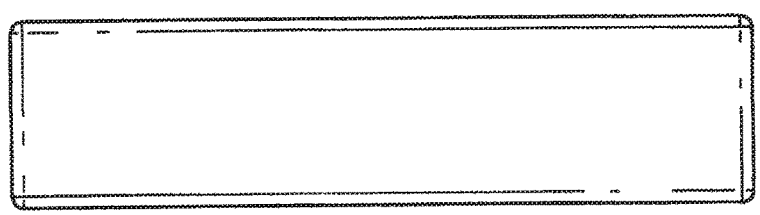
FIGS. 26-28 are orthographic views the model block or replication block of FIG. 25.
Figure 26:
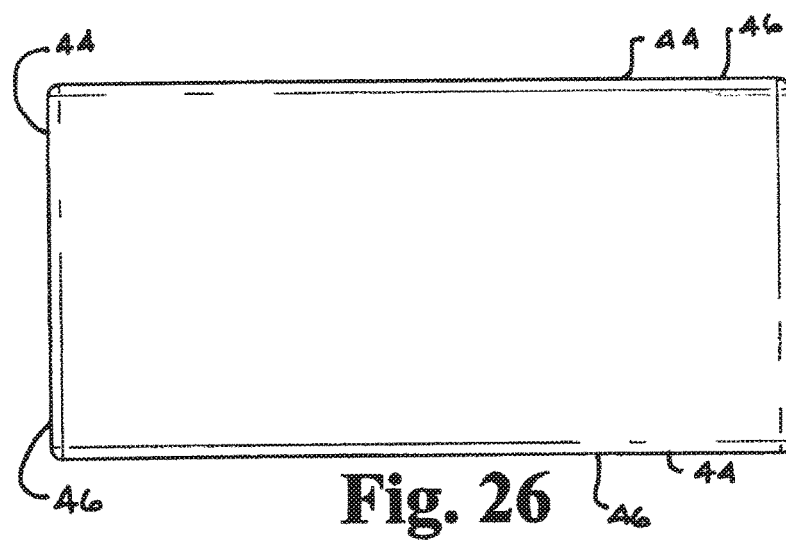
Figure 28:
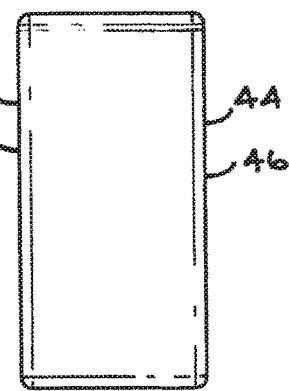

In the present system embodiment, the first type of component model block 28A or replication block 32A shown in FIGS. 11-15 represents, or is, a green triangular prism; the second type of component model block 28B or replication block 32B shown in FIGS. 16-18 represents, or is, a red square prism; the third type of component model block 28C or replication block 32C shown in FIGS. 19-21 represents, or is, a yellow square prism; the fourth type of component model block 28D or replication block 32D shown in FIGS. 22-24 represents, or is, a small, purple rectangular prism; and the fifth type of component model block 28E or replication block 32E shown in FIGS. 25-28 represents, or is, a large, blue rectangular prism. The positions of these various types of blocks 28, 32 in depicted model 24 and replication 30 of FIGS. 3-10 are indicated in FIGS. 3 and 4. The colors, shapes and relative sizes of the above types (A-E) of component model blocks 28 and replication blocks 32 may differ from those described above or shown in the drawings, which herein serve only as exemplary embodiments. Different types of component model blocks 28 and replication blocks 32 may be otherwise distinguishable from one another. For example, contrasting colors or shades, rather than any particular different colors, can distinguish blocks 28, 32 of a common shape and size as different block types.

In the present embodiment, the electronically displayed set of images 22 of FIGS. 1 and 2 includes static images 34 (of which four are shown) and an animated image 36. The set of images 22 is displayed over the course of the game round to permit the user(s) to continually review and analyze the model 24 while replicating it. The animated image 36 provides changing views of the model 24 continuously in a repeating loop, with each loop having a duration of several (e.g., ten) seconds, whereby the user(s) can thoroughly inspect the model 24 in its entirety. In the present embodiment, the animated image 36 provides a rotating view 38 of the model 24 in its assembled state, wherein the component model blocks 28 are contiguous. That the model 24 shown in the animated image 36 is a rotating view 38 is indicated by the imaginary arrow 40 in FIG. 1.

At one point during the loop, rotation of the model 24 halts and the animated image 36 then provides an exploding view 42 of the model 24, as shown in FIG. 2. During explosion of the model 24 the animated image 36 changes between its assembled state and different exploded states in which the component model blocks 28 of the model 24 are shown in various degrees of separation from each other. From the view showing the highest degree of component model block separation, the exploded model 24 then contracts and returns to its assembled state; the rotation of the model 24 then resumes and continues to the end of the animation sequence, and the loop then repeats.

FIGS. 3-10 provide various isometric and orthographic views of the model 24 example in its assembled state or a completed replication 30 thereof. Four of these views are displayed as the static images 34 of the model 24 in the set of images 22. In some embodiments, a greater or lesser number of static images 34 of the model 24 are provided, and/or the static images 34 may be user-selected and/or displayed as a cycling slideshow depicting various views as shown, for example, in FIGS. 3-10.

Certain embodiments of the system also include an indicator by which a player in a game facilitating competitive structured block play, audibly or visually signals completion of his or her replication 30. The signal may, for example, be produced by an indicator device or indicated with the player's voice or body movement as described above.

Certain embodiments of a system and method according to the present disclosure are envisioned in which the 3-D model 24 displayed for analysis by the user is depicted in a set of images that includes only multiple static images similar to static images 34, without the benefit of an animated image 36 or perhaps even a display screen 26. These multiple static images may be provided on a display screen 26 as described above, or they may be provided on one or multiple cards. The multiple static images of such embodiments may be solely orthographic views of the 3-D model, or a combination of orthographic and isometric views of the 3-D model. Moreover, it is envisioned that these multiple static images might include cross-sectional views of certain 3-D models 24, whereby details relating to interior portions of the model's structure and the relationships between its component model blocks 28 may be inspected during user analysis.

Figure 12:
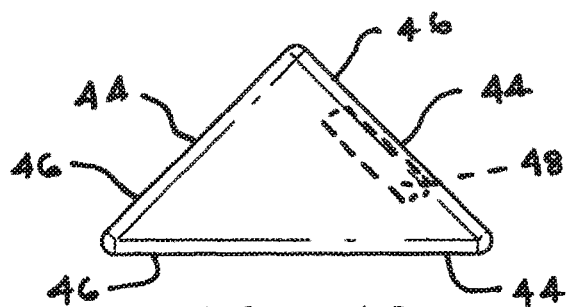
Figure 15:
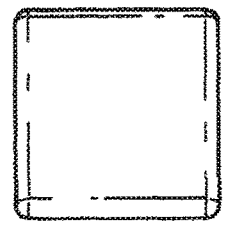
Figure 14:
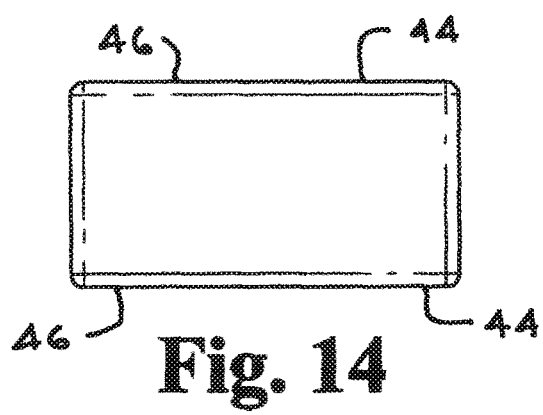

Certain embodiments of system 20 include replication blocks 32 having magnetic surfaces or otherwise comprising magnets. In such embodiments, the set of replication blocks 32 includes a plurality of magnetic replication blocks 32M that are magnetically attracted to each other, with adjacent magnetic replication block surfaces 44 adapted for being magnetically coupled and held in abutment together. For example, the exposed exterior surfaces 44 of the magnetic replication blocks 32M may be defined by pieces of thin pieces of magnetic film 46, similar to ordinary printed refrigerator magnets, that are adhered to the body of each magnetic replication block 32M. Alternatively, the magnetic replication blocks 32M may include magnets 48 located beneath and proximate to, or defining, their exposed exterior surfaces 44. One such magnet 48 is shown in FIG. 12. Such magnetic replication block 32M embodiments facilitate the replication of 3-D models 24 having a component model block 28 that is cantilevered or extending laterally, or that depends vertically, from another component model block 28 without requiring support from beneath.

Figure 29:
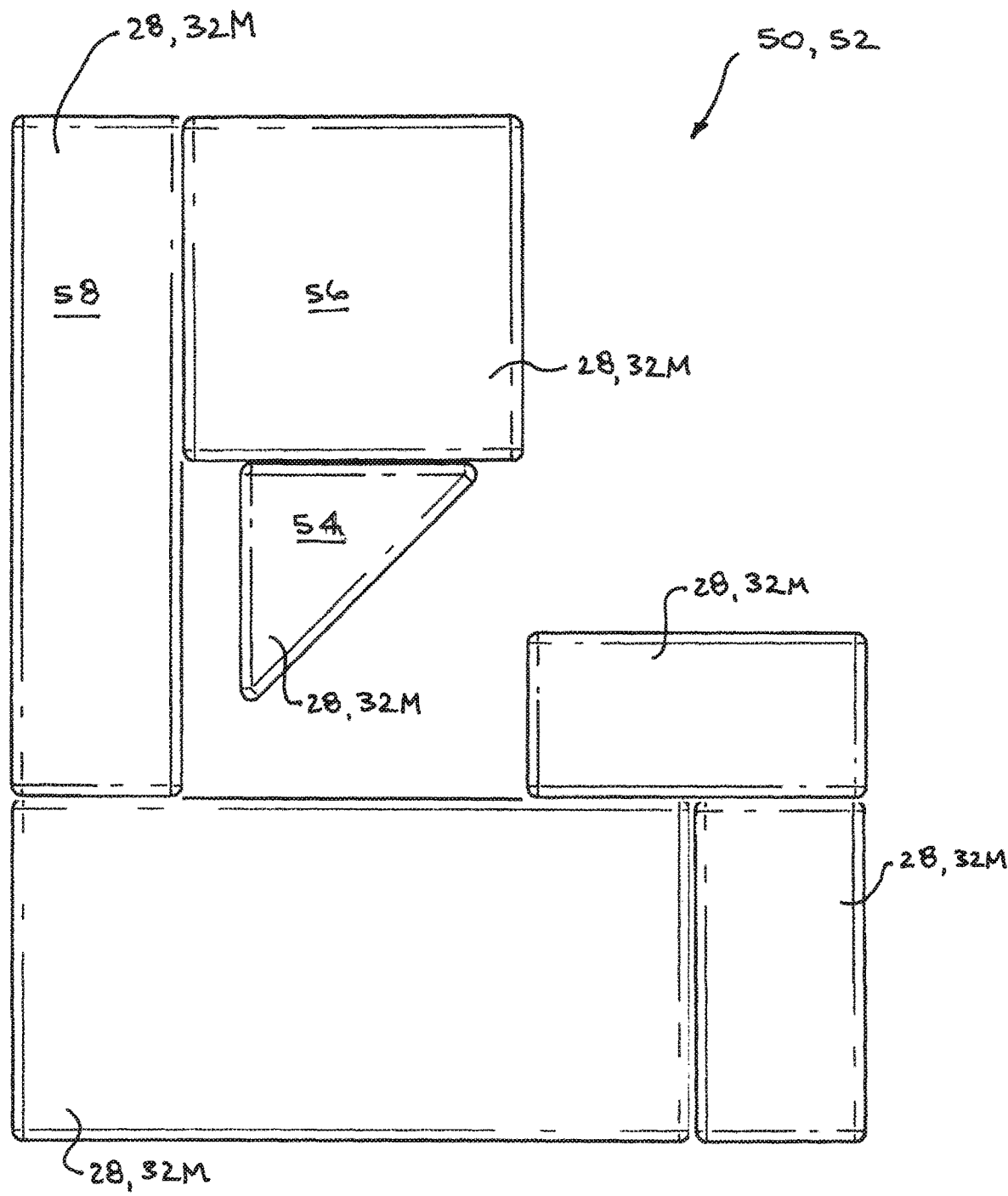
FIG. 29 is an orthographic view of an exemplary 3-D model or replication in which one component model block or replication block vertically depends, or laterally extends, from another.

FIG. 29 shows one such example embodiment of a predefined 3-D model 50, or a replication 52 thereof that is constructed of magnetic replication blocks 32M. Model 50 includes two component model blocks 28 shown positioned in a mutually vertically abutting relationship, with one component model block 28 indicated as block 54, depending downwardly from another component model block 28 indicated as block 56. Replication 52 of model 50 includes a plurality of magnetic replication blocks 32M configured to be positionable in a vertical relationship with one replication block 32M indicated as block 54, magnetically coupled to and projecting generally vertically downward from a surface of another, relatively higher replication block 32M indicated as block 56. In replication 52, depending block 54 is magnetically coupled in abutting relationship with overlying block 56 without requiring support from beneath.

With continuing reference to FIG. 29, the depicted example 3-D model 50 also has one component model block 28 indicated as above-mentioned block 56, positioned in a horizontal abutting relationship with, and laterally extending from another component model block 28 indicated as block 58. Replication 52 replicates model 50 with a plurality of magnetic replication blocks 32M configured to be positionable in a lateral relationship without the cantilevered replication block 32M requiring support from beneath. The cantilevered replication block 32M indicated as block 56 is magnetically coupled to and laterally extends from a surface of horizontally adjacent replication block 32M indicated as block 58. In replication 52, cantilevered block 56 is magnetically coupled in abutting relationship with adjacent block 58 without requiring support from beneath.

Figure 30:
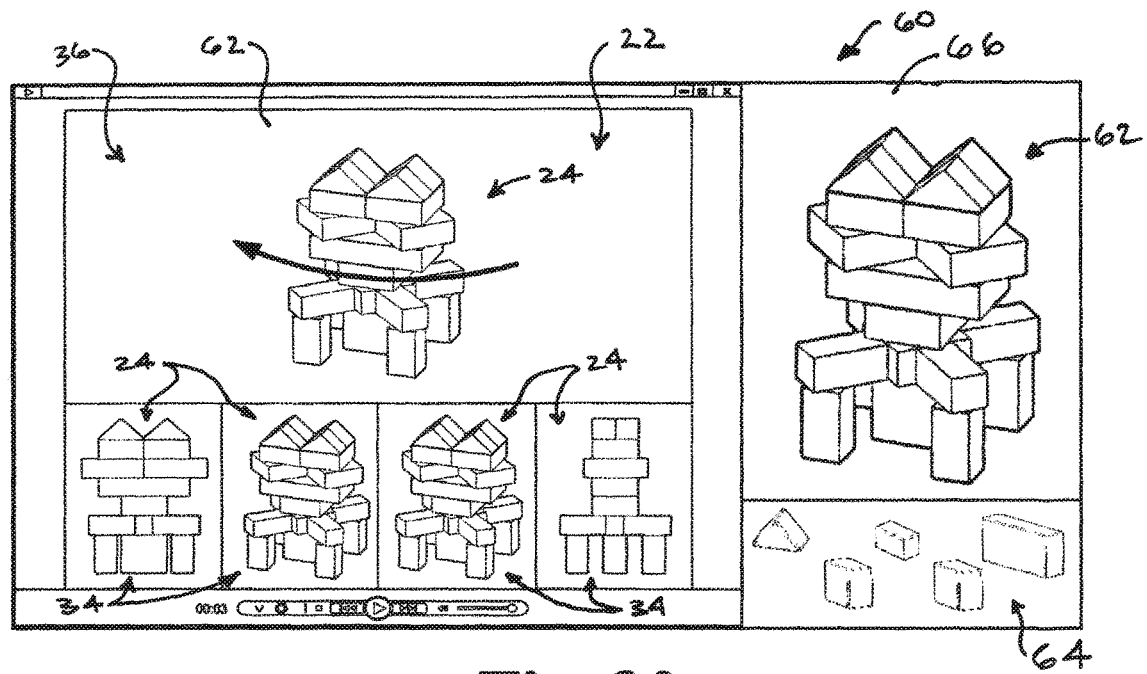
FIG. 30 is a view of a display screen showing both a model defined by a set of images of an exemplary embodiment of a predefined 3-D arrangement of component model blocks at a first time during a round of structured block play as in FIG. 1, and a computer-generated replication constructed by a user, according to the present disclosure.

As mentioned above, in certain embodiments of a system according to the present disclosure, the replication blocks 32 are intangible and computer-generated, such that the replication is electronically displayed on a display screen of, for example, a video or computer monitor, tablet or smart phone. Referring to FIG. 30, in system 60 according to such an embodiment, the computer-generated replication 62 is constructed from user-selectable, computer-generated replication blocks 64 and displayed on the same display screen 66 of the machine generating the pre-defined 3-D model 24, with the set of images 22 depicting the model. The machine may be a computer, tablet or smart phone.

Figure 31:
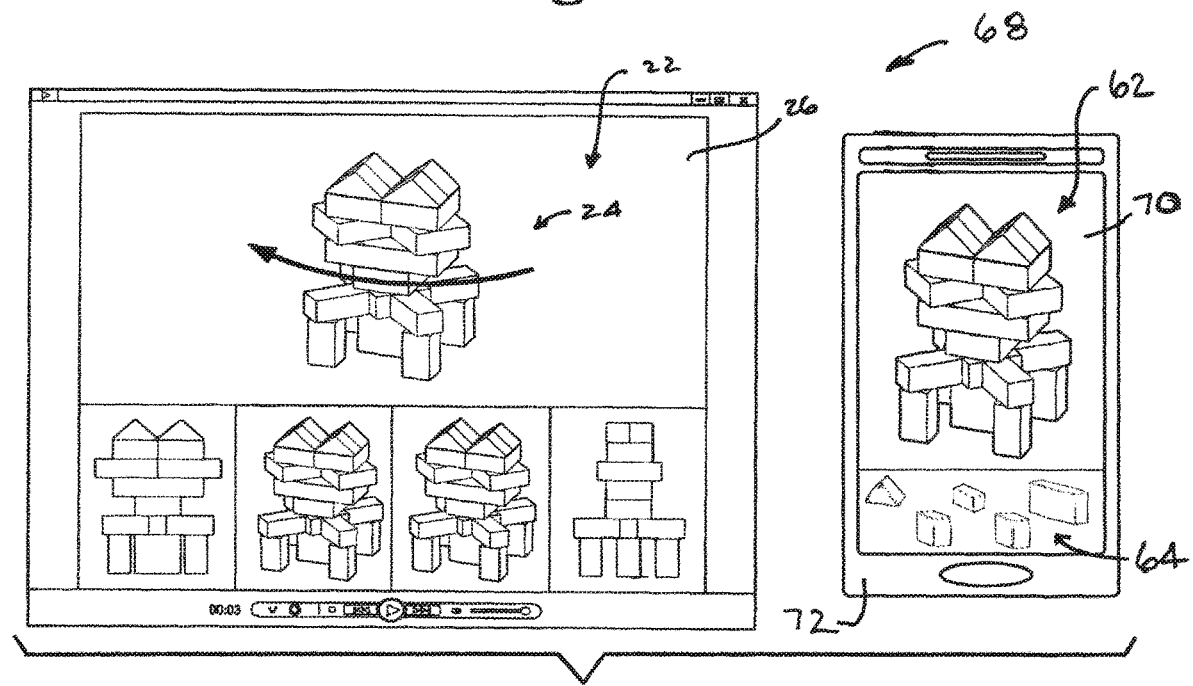
FIG. 31 is a view of a display screen showing a model defined by a set of images of an exemplary embodiment of a predefined 3-D arrangement of component model blocks at a first time during a round of structured block play as in FIG. 1, and of a display screen of a separate machine showing a computer-generated replication constructed by a user, according to the present disclosure.

Referring to FIG. 31, in system 68 according to another such embodiment, the computer-generated replication 62 is constructed from user-selectable, computer-generated replication blocks 64 and is displayed on a display screen 70 that is separate and apart from the display screen that shows the set of images 22 depicting the model 24. That display screen may, for example, be display screen 26 of system 20 (FIGS. 1 and 2). Display screen 70 may be the display screen of a machine 72 (e.g., a computer, tablet or smart phone) that is separate and apart from that which generates the set of images 22 depicting the model 24, or display screen 70 may instead be the display screen of a separate computer monitor connected to the machine that generates the set of images 22.

While exemplary embodiments have been disclosed hereinabove, the invention is not necessarily limited to the disclosed embodiments. Instead, this application is intended to cover any variations, uses, or adaptations of the present disclosure using its general principles. Further, this application is intended to cover such departures from the present disclosure as come within known or customary practice in the art to which this present disclosure pertains and which fall within the limits of the appended claims.

| ELEMENT NUMBERING LIST | |
|---|---|
| 1 | |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | System (FIGS. 1, 2) |
| 21 | |
| 22 | Set of images |
| 23 | |
| 24 | Predefined model |
| 25 | |
| 26 | Display screen |
| 27 | |
| 28 | Component model block(s) of 24 |
| 28A | First type of 28, green triangular prism |
| 28B | Second type of 28, red square prism |
| 28C | Third type of 28, yellow square prism |
| 28D | Fourth type of 28, small purple rectangular prism |
| 28E | Fifth type of 28, large blue rectangular prism |
| 29 | |
| 30 | Replication |
| 31 | |
| 32 | Replication block(s) of 30 |
| 32M | Magnetic replication blocks(s) of 30 |
| 32A | First type of 32, 32M, green triangular prism |
| 32B | Second type of 32, 32M, red square prism |
| 32C | Third type of 32, 32M, yellow square prism |
| 32D | Fourth type of 32, 32M, small purple rectangular prism |
| 32E | Fifth type of 32, 32M, large blue rectangular prism |
| 33 | |
| 34 | Static images of 22 |
| 35 | |
| 36 | Animated image of 22 |
| 37 | |
| 38 | Rotating view of 36 |
| 39 | |
| 40 | Arrow of 38 |
| 41 | |
| 42 | Exploding view of 36 |
| 43 | |
| 44 | Exterior surface(s) of 32M |
| 45 | |
| 46 | Magnetic film defining 44 |
| 47 | |
| 48 | Magnet(s) of 32M |
| 49 | |
| 50 | 3-D model of FIG. 29 |
| 51 | |
| 52 | 3-D replication of FIG. 29 |
| 53 | |
| 54 | Block of 50, 52 |
| 55 | |
| 56 | Block of 50, 52 |
| 57 | |
| 58 | Block of 50, 52 |
| 59 | |
| 60 | System (FIG. 30) |
| 61 | |
| 62 | Computer-generated replication of 60, 62 |

-continued

| ELEMENT NUMBERING LIST | |
|---|---|
| 63 | |
| 64 | Replication blocks of 62 |
| 65 | |
| 66 | Display screen of 60 |
| 67 | |
| 68 | System (FIG. 31) |
| 69 | |
| 70 | Display screen of 72 |
| 71 | |
| 72 | Replication machine of 68 |
| 73 | |

What is claimed is:

1. A system for facilitating structured block play, comprising:
a set of images providing a spatial representation of a predefined 3-D arrangement of blocks for analysis by a user wherein the set of images are adapted for electronic display and include at least one animated image providing a changing view of the predefined 3-D arrangement of blocks, the at least one animated image providing at least one of a rotating view and an exploding view of the predefined 3-D arrangement of blocks and wherein cyclically repeating views of the predefined 3-D arrangement are provided by the animated image;
a set of tangible blocks configured to be physically positioned by the user into a replication of the predefined 3-D arrangement; and
an indicator for signaling the user's completion of the replication.

2. The system of claim 1, wherein the set of blocks is configured to be positioned with the user's hand.

3. The system of claim 1, further comprising a second set of blocks wherein each block of the second set of blocks is a computer-generated representation of a physical block adapted to be positioned through the user's manipulation of a computer input device, and wherein the replication formed with the second set of blocks is a computer-generated replication adapted for electronic display.

4. The system of claim 3, wherein the indicator is actuable by the user through manipulation of a computer input device.

5. The system of claim 1, wherein the indicator is manually-actuable by the user.

6. The system of claim 1, wherein actuation of the indicator causes production of an audible signal.

7. The system of claim 6, wherein the indicator is a bell.

8. The system of claim 1, wherein actuation of the indicator causes production of a visual signal.

9. The system of claim 1, wherein the positioning of the blocks includes vertically stacking at least a first block and a second block, the second block relatively lower than and supported by the first block.

10. The system of claim 1, wherein the set of blocks comprises a plurality of blocks that are magnetically attracted to each other.

11. The system of claim 10, wherein at least one of the plurality of blocks comprises a magnet.

12. The system of claim 11, wherein the at least one of the plurality of blocks has a surface defined by a magnet.

13. The system of claim 11, wherein each of the plurality of blocks comprises a magnet.

14. The system of claim 10, wherein first and second blocks of the plurality of blocks are configured to be positionable in a vertical relationship with the relatively lower one of the first and second blocks magnetically coupled to and projecting generally vertically from the relatively higher one of the first and second blocks.

15. The system of claim 10, wherein first and second blocks of the plurality of blocks are configured to be positionable in a horizontal relationship with one of the first and second blocks magnetically coupled to and projecting generally horizontally from the other of the first and second blocks.

16. The system of claim 1, wherein a rotating view of the predefined 3-D arrangement of blocks is provided by the animated image.

17. The system of claim 1, wherein an exploding view of the predefined 3-D arrangement is provided by the animated image.

18. The system of claim 17, wherein a view of the predefined 3-D arrangement in at least one expanded state in which the blocks of the predefined 3-D arrangement are shown separated from each other is provided by the animated image.

19. The system of claim 1, wherein a rotating view and an exploding view of the predefined 3-D arrangement are provided by the animated image.

20. The system of claim 1, wherein replication of the predefined 3-D arrangement by each of two or more users in competitive structured block play comprising a race between the users to complete their respective, concurrently constructed replications is facilitated.

21. The system of claim 1, wherein replication of the predefined 3-D arrangement by a user in structured block play comprising an individual race against a clock to complete the user's respective replication is facilitated.

22. The system of claim 21, wherein the facilitated structured block play comprises two or more users each in an individual race against a clock to complete the user's respective replication in a comparatively shorter time.

23. The system of claim 1 wherein the predefined 3-D arrangement of blocks includes blocks positioned in both a vertical relationship and a horizontal relationship relative to other blocks.

24. The system of claim 23 wherein the set of tangible blocks includes blocks defining a plurality of different shapes.

25. The system of claim 24 wherein the differently shaped blocks have different colors with each color corresponding to a different shape.

26. A system for facilitating structured block play, comprising:
a set of images providing a spatial representation of a predefined 3-D arrangement of blocks for analysis by a user wherein the set of images are adapted for electronic display and include at least one animated image providing a changing view of the predefined 3-D arrangement of blocks wherein the changing view of the predefined 3-D arrangement of blocks changes in real time, the at least one animated image providing at least one of a rotating view and an exploding view of the predefined 3-D arrangement of blocks and wherein cyclically repeating views of predefined 3-D arrangement are provided by the animated image; and
a set of tangible blocks configured to be manually positioned by the user into a replication of the predefined 3-D arrangement;
wherein replication of the predefined 3-D arrangement by each of two or more users in competitive structured block play comprising a race between the users to concurrently complete their respective replications is facilitated.

27. The system of claim 26, further comprising a second set of blocks wherein each block of the second set of blocks is a computer-generated representation of a physical block adapted to be positioned through the user's manipulation of a computer input device, and wherein the replication formed with the second set of blocks is a computer-generated replication adapted for electronic display.

28. The system of claim 27, further comprising a user-actuable indicator adapted to generate upon actuation a signal indicative of a user's completion of the respective replication, wherein the indicator is actuable by the user through manipulation of a computer input device.

29. The system of claim 26, further comprising a user-actuable indicator adapted to generate upon actuation a signal indicative of a user's completion of the respective replication.

30. The system of claim 29, wherein the indicator is manually-actuable by the user.

31. The system of claim 29, wherein actuation of the indicator causes production of an audible signal.

32. The system of claim 31, wherein the indicator is a bell.

33. The system of claim 29, wherein actuation of the indicator causes production of a visual signal.

34. The system of claim 26, wherein the positioning of the blocks includes vertically stacking at least a first block and a second block, the second block relatively lower than and supported by the first block.

35. The system of claim 26, wherein the set of blocks comprises a plurality of blocks that are magnetically attracted to each other.

36. The system of claim 35, wherein at least one of the plurality of blocks comprises a magnet.

37. The system of claim 36, wherein the at least one of the plurality of blocks has a surface defined by a magnet.

38. The system of claim 36, wherein each of the plurality of blocks comprises a magnet.

39. The system of claim 35, wherein first and second blocks of the plurality of blocks are configured to be positionable in a vertical relationship with the relatively lower one of the first and second blocks magnetically coupled to and projecting generally vertically from the relatively higher one of the first and second blocks.

40. The system of claim 35, wherein first and second blocks of the plurality of blocks are configured to be positionable in a horizontal relationship with one of the first and second blocks magnetically coupled to and projecting generally horizontally from the other of the first and second blocks.

41. The system of claim 26, wherein a rotating view of the predefined 3-D arrangement of blocks is provided by the animated image.

42. The system of claim 26, wherein an exploding view of the predefined 3-D arrangement is provided by the animated image.

43. The system of claim 42, wherein a view of the predefined 3-D arrangement in at least one expanded state in which the blocks of the predefined 3-D arrangement are shown separated from each other is provided by the animated image.

44. The system of claim 26, wherein a rotating view and an exploding view of the predefined 3-D arrangement are provided by the animated image.

* * * * *